United States Patent
Nishimura

(10) Patent No.: US 8,780,719 B2
(45) Date of Patent: Jul. 15, 2014

(54) PACKET RELAY APPARATUS AND CONGESTION CONTROL METHOD

(75) Inventor: Kazuto Nishimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 317 days.

(21) Appl. No.: 12/957,129

(22) Filed: Nov. 30, 2010

(65) Prior Publication Data

US 2011/0128853 A1 Jun. 2, 2011

(30) Foreign Application Priority Data

Dec. 1, 2009 (JP) .................................. 2009-273220

(51) Int. Cl.

| | | |
|---|---|---|
| G01R 31/08 | (2006.01) | |
| G06F 11/00 | (2006.01) | |
| G08C 15/00 | (2006.01) | |
| H04J 1/16 | (2006.01) | |
| H04J 3/14 | (2006.01) | |
| H04L 1/00 | (2006.01) | |
| H04L 12/26 | (2006.01) | |

(52) U.S. Cl.
USPC ........... 370/235; 370/232; 370/233; 370/234; 370/236

(58) Field of Classification Search
USPC ......... 370/229, 236, 237, 238, 331–334, 351, 370/389, 428, 429, 431, 437, 412–418, 370/232–235
See application file for complete search history.

(56) References Cited

U.S. PATENT DOCUMENTS

| | | | |
|---|---|---|---|
| 2003/0088692 A1* | 5/2003 | Badovinatz et al. | 709/237 |
| 2003/0223447 A1* | 12/2003 | Saxena et al. | 370/428 |
| 2005/0163139 A1* | 7/2005 | Robotham et al. | 370/412 |
| 2005/0232147 A1* | 10/2005 | Bang et al. | 370/229 |
| 2010/0091782 A1* | 4/2010 | Hiscock | 370/412 |
| 2010/0254275 A1* | 10/2010 | Kang et al. | 370/252 |

FOREIGN PATENT DOCUMENTS

| | | |
|---|---|---|
| JP | 07-066838 A | 3/1995 |
| JP | 10-322392 | 12/1998 |
| JP | 2000-078188 | 3/2000 |
| JP | 2009-005193 A | 1/2009 |

OTHER PUBLICATIONS

"Japanese Office Action" mailed by JPO and corresponding to Japanese Application No. 2009-273220 dated May 7, 2013. Partial English Translation of the relevant parts; p. 1, line 19 to p. 2, line 12, and p. 2, line 16 to line 18.

* cited by examiner

*Primary Examiner* — Awet Haile
*Assistant Examiner* — Eric Myers
(74) *Attorney, Agent, or Firm* — Fujitsu Patent Center

(57) ABSTRACT

A packet relay apparatus relaying a packet exchanged between communication apparatuses with a connection established is provided. The packet relay apparatus includes a buffer for storing a packet selected from among arrival packets so that a transfer of the selected packet is to be suspended, and a congestion controller for monitoring, after the storage of the packet on the buffer, a packet passing through the packet relay apparatus, and causing the packet, stored on the buffer, to be transmitted at a timing responsive to a passage status of a packet having the same connection as the connection of the packet stored on the buffer.

14 Claims, 19 Drawing Sheets

FIG. 5

| BUFFER NUMBER | SOURCE | | DESTINATION | | DUPLICATE ACK |
|---|---|---|---|---|---|
| | IP ADDRESS | PORT NUMBER | IP ADDRESS | PORT NUMBER | |
| 1 | 11.22.33.XX | 2920 | 55.66.77.XX | 80 | 1 |
| 2 | | | | | |
| ... | ... | ... | ... | ... | ... |

| BUFFER NUMBER | SOURCE | | DESTINATION | | DUPLICATE ACK | SEQUENCE NUMBER |
|---|---|---|---|---|---|---|
| | IP ADDRESS | PORT NUMBER | IP ADDRESS | PORT NUMBER | | |
| 1 | 11.22.33.XX | 2920 | 55.66.77.XX | 80 | 1 | 1001 |
| 2 | | | | | | |
| ... | ... | ... | ... | ... | ... | ... |

| SOURCE | | DESTINATION | | DUPLICATE ACK | D-ACK TIMER | RETRANSMISSION TIMER |
|---|---|---|---|---|---|---|
| IP ADDRESS | PORT NUMBER | IP ADDRESS | PORT NUMBER | | | |
| 11.22.33.XX | 2920 | 55.66.77.XX | 80 | 2 | 200 ms | 3000 ms |
| ... | ... | ... | ... | ... | ... | ... |

232

PACKET RELAY APPARATUS AND CONGESTION CONTROL METHOD

CROSS-REFERENCE TO RELATED APPLICATION

This application is based upon and claims the benefit of priority of the prior Japanese Patent Application No. 2009-273220, filed on Dec. 1, 2009, the entire contents of which are incorporated herein by reference.

FIELD

Embodiments discussed herein relate to a packet relay apparatus and a congestion control method.

BACKGROUND

Packet communications performed using communication protocols such as transmission control protocol (TCP)/Internet protocol (IP) are in widespread use. In a network of a packet communication, congestion may occur in a communication apparatus (packet relay apparatus) relaying a packet.

To avoid congestion, the packet relay apparatus may discard some of a received number packets to be relayed. For example, if a transmission buffer becomes full in a method called tail drop, all packets to arrive thereafter are discarded until the transmission buffer is emptied. In a method called random early detection (RED), if the number of packets retained exceeds a threshold value even before a transmission buffer is full, packets to arrive are discarded stochastically.

If the packet relay apparatus discards a packet, a communication apparatus, which is a source of the discarded packet does not receive an expected acknowledgement (ACK) from a communication apparatus that is the intended destination of the packet. The source communication apparatus transmits a packet and then waits until a specific condition is satisfied (for example, a specific time period has elapsed since the transmission). If an expected ACK is not received, the source communication apparatus retransmits the packet on the assumption that the packet has been discarded. This method lowers a transmission rate of the source communication apparatus and restricts an inflow of packets to the packet relay apparatus.

A frame discarding method is available as a technique of discarding packets. In the frame discarding method, a frame is tagged with time information before being retained on a transmission buffer, retention time of the frame is detected based on the time information, and the frame is discarded when the retention time exceeds a retention permission time (for example, see Japanese Laid-open Patent Publication No. 2009-5193).

Congestion control methods free from packet discarding have been studied. In one such method, a frame received first, from among frames retained in a queue, is not transmitted for a specific period of time after congestion is detected, and a subsequent frame is transmitted earlier (Japanese Laid-open Patent Publication No. 7-66838). If the packet relay apparatus suspends the transmission of a packet, a communication apparatus as a source of a packet receives an expected ACK at a delayed timing. This method also restricts the inflow of packets to the packet relay apparatus.

From the standpoint of network communication efficiency, congestion control is performed not to retransmit the packet. In the method discussed in Japanese Laid-open Patent Publication No. 7-66838, the packet transmission is suspended for a constant period of time. The packet retransmission is not sufficiently controlled for the reason described below.

The timing of the packet retransmission is not necessarily determined by a time elapse from the transmission of the packet from the source communication apparatus. For example, if a communication apparatus as a destination receives a packet not agreeing with a sequence number in a high-speed retransmission mechanism of TCP, the destination communication apparatus transmits an ACK called a duplicate ACK to a communication apparatus as a source. Upon receiving the duplicate ACKs of a specific number, the source communication apparatus retransmits the packet as a result of determining that the packet has been discarded. In other words, a retransmission occurs before a specific time has elapsed since the packet transmission.

SUMMARY

According to an aspect of the embodiments discussed herein, a packet relay apparatus relaying a packet exchanged between communication apparatuses with a connection established, the packet relay apparatus includes a buffer to store a packet selected from among arrival packets so that a transfer of the selected packet is to be suspended; and a congestion controller to monitor, after the storage of the packet on the buffer, a packet passing through the packet relay apparatus, and causing the packet, stored on the buffer, to be transmitted at a timing responsive to a passage status of a packet having a same connection as the connection of the packet stored on the buffer.

It is to be understood that both the foregoing general description and the following detailed description are exemplary and explanatory and are not restrictive of the embodiments, as claimed.

BRIEF DESCRIPTION OF DRAWINGS

FIG. 5 illustrates a structure of a connection table of the second embodiment;

FIG. 12 illustrates a structure of a connection table of the third embodiment;

FIG. 13 illustrates a structure of a learning table of the third embodiment;

DESCRIPTION OF EMBODIMENTS

First Embodiment

Figure 1:
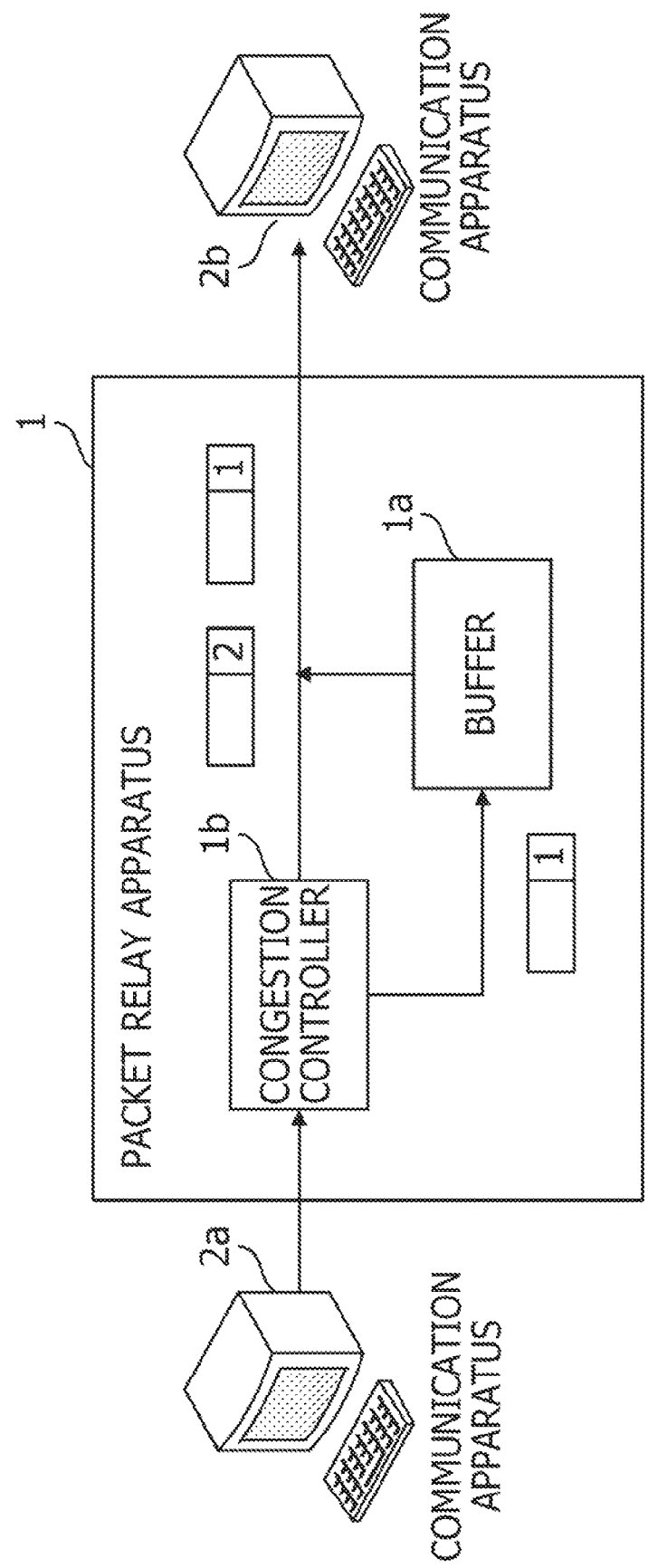
FIG. 1 illustrates a packet relay apparatus of a first embodiment.

FIG. 1 illustrates a packet relay apparatus 1 of a first embodiment. The packet relay apparatus 1 relays a packet to be exchanged between communication apparatuses with a connection established. The packet relay apparatus 1 is connected to communication apparatuses 2a and 2b via a network, and is installed in a path of a connection between the communication apparatuses 2a and 2b. The packet relay apparatus 1 includes a buffer 1a and a congestion controller 1b.

The buffer 1a is a memory storing a packet selected from arrival packets on the packet relay apparatus 1 so that a transfer of a selected packet may be suspended. The buffer 1a may store a packet relating to at least one connection. If packets of a plurality of connections are stored, the buffer 1a may identify the connections from each other. The buffer 1a may include a plurality of physically separated memories, or may include a single physical memory having a storage volume partitioned into a plurality of areas, for example.

If a packet, the transfer of which is suspended, is stored on the buffer 1a, the congestion controller 1b monitors a subsequent packet passing through the packet relay apparatus 1. The congestion controller 1b releases and transmits a packet from the buffer 1a at a timing responsive to a passage status of a packet having the same connection as the connection of the packet stored on the buffer 1a. The congestion controller 1b determines whether the packets have the same connection or not, based on a source address, a destination address, a source port number, and a destination port number included in a header of each of the packets.

The congestion controller 1b may count subsequent packets having the same connection, and transmits the packets, stored on the buffer 1a, at a timing at which the number of subsequent packets having passed through the packet relay apparatus 1 reaches a specific number. The congestion controller 1b may monitor a time elapse from a preceding detection of a packet having the same connection, and correct the count results based on the time elapse.

The congestion controller 1b may estimate the number of response packets (duplicate ACKs) transmitted from the communication apparatus 2b to the communication apparatus 2a, based on the number of passing packets and the time elapse. The congestion controller 1b may determine the timing based on the estimated number of response packets. The congestion controller 1b may monitor the time elapse from the storage of the packet on the buffer 1a, and determine the timing based on the time elapse as well.

The congestion controller 1b may detect a retransmission packet from among the packets stored on the buffer 1a. The congestion controller 1b determines whether the packet is a retransmission packet, based on a sequence number included in the header of the packet. The retransmission packet may be detected prior to or subsequent to the transmission of the packet stored on the buffer 1a.

If a retransmission packet is detected, the congestion controller 1b may correct a parameter for use in the determination of the transmission timing of the packet stored on the buffer 1a in order to control the occurrence of a subsequent retransmission. For example, the congestion controller 1b corrects a threshold value on the number of subsequent packets of the same connection, a threshold value on the time elapse from the previous detection of a packet having the same connection, and a threshold value on the time elapse from the storage of the packet on the buffer 1a.

If the occurrence of congestion is detected on the packet relay apparatus 1, the congestion controller 1b performs the above-described congestion control process by storing the packet on the buffer 1a. If the clearance of the congestion is detected, the congestion controller 1b releases the packet from the buffer 1a and then stops the congestion control process. Subsequent of the occurrence of the congestion, the congestion controller 1b may perform the congestion control process on each of the connections. In such a case, the congestion controller 1b may set a maximum number on the number of connections as a target of the congestion control process depending on a retention status of packets on a buffer (not illustrated) temporarily storing a packet waiting for transmission.

In the packet relay apparatus 1, a packet with the transfer thereof suspended is selected from among arrival packets and then stored on the buffer 1a. After the packet is selected, the congestion controller 1b monitors a packet passing through the packet relay apparatus 1 and performs the congestion control process to transmit the packet stored on the buffer 1a at the timing in accordance with a passage status of the packet having the same connection as the connection of the packet stored on the buffer 1a.

The congestion control process lowers a transmission rate of a packet communication between the communication apparatuses 2a and 2b, and alleviates the congestion on the packet relay apparatus 1. The congestion control process controls the occurrence of a packet retransmission, and a decrease in the communication efficiency of the network. The packet relay apparatus 1 in the congestion control process accounts for the passage status of a subsequent packet having the same connection as the connection of the packet with the transfer thereof suspended. The packet relay apparatus 1 may flexibly cope with a variety of retransmission control methods including a high-speed retransmission mechanism of TCP, and reduce the possibility of packet retransmission.

The packet relay apparatus 1 may automatically correct a parameter that is used to determine the transmission timing of a retained packet. If the prediction of the timing of the occurrence of a packet retransmission is erroneous, the possibility of a subsequent occurrence of retransmission is lowered thereafter in the congestion control process. The packet relay apparatus 1 may further adjust the number of connections as a target of the congestion control process depending on the degree of congestion. More specifically, the packet relay apparatus 1 may lower the degree of reducing a transmission rate depending on the congestion.

The congestion control process is not limited to TCP/IP but may be applicable to a variety of communication protocols for packet communications with a connection established. The term "packet" in the congestion control process refers to a constant data unit exchanged between the communication apparatuses 2a and 2b, and may include a unit called a frame. The packet relay apparatus 1 relays a packet, and may include a module called a router or a switch.

A second and a third embodiment with the congestion control process applied to TCP/IP are described in detail below.

Second Embodiment

Figure 2:
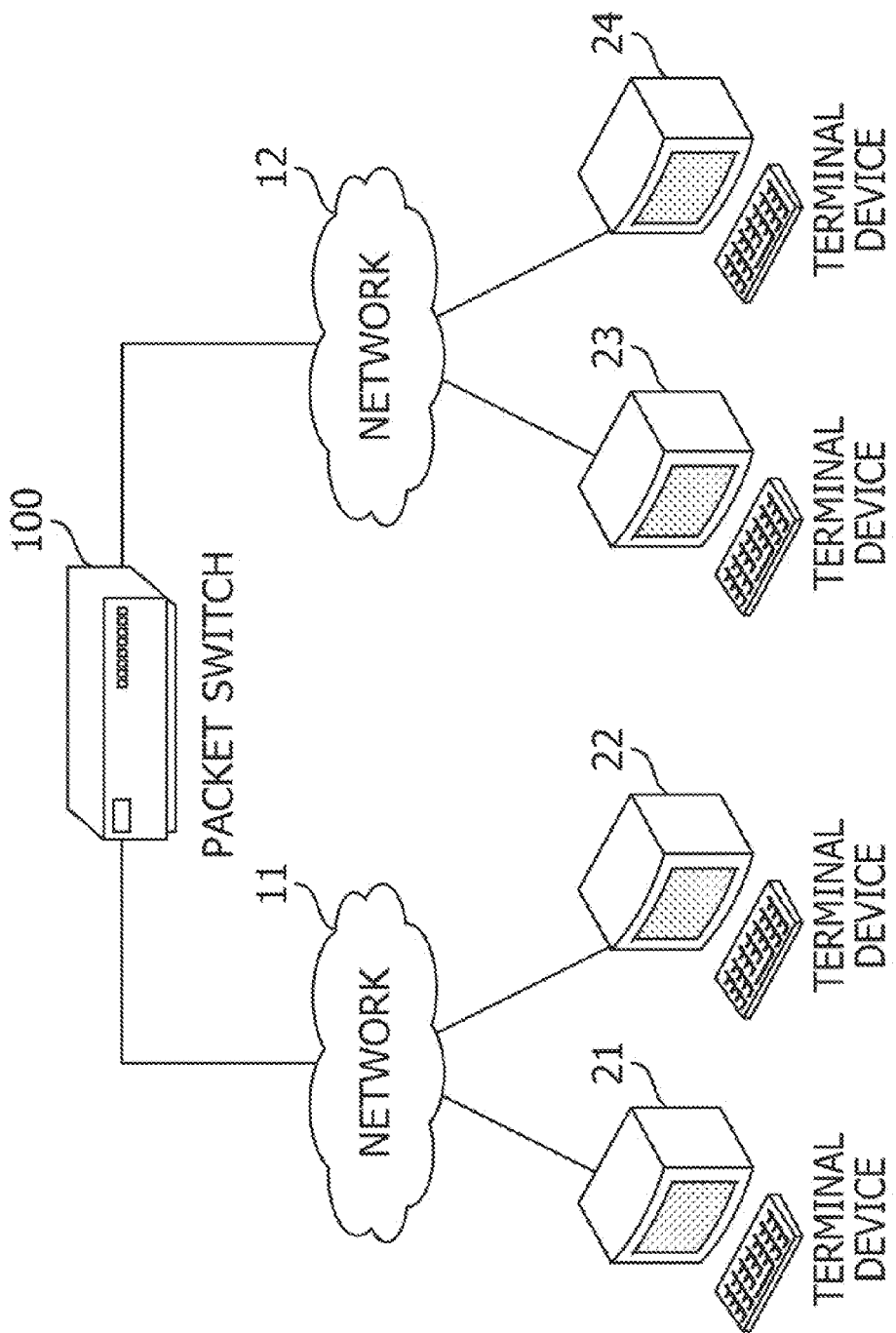
FIG. 2 illustrates a communication system of a second embodiment.

FIG. 2 illustrates a communication system of the second embodiment. The communication system of the second embodiment includes networks 11 and 12, terminal devices 21-24, and a packet switch 100.

The networks 11 and 12 are data communication networks performing a packet communication based on TCP/IP. The networks 11 and 12 may include communication devices (not illustrated) such as a router and a bridge. The networks 11 and 12 may also include a wireless communication service as part thereof.

The terminal devices 21-24 are communication terminal apparatuses performing a packet communication based on TCP/IP and serve as a terminal of a TCP connection. The terminal devices 21 and 22 are connected to the network 11 in a wired or wireless fashion, and perform a packet communication with another terminal device via the network 11. The terminal devices 23 and 24 are connected to the network 12 in a wired or wireless fashion and perform a packet communication with another terminal device via the network 12.

The packet switch 100 is a communication apparatus relaying packet between the network 11 and the network 12. The packet switch 100 receives from the network 11 a packet the terminal device 21 has transmitted to the terminal device 23, and transfers the packet to the network 12. The packet switch 100 receives from the network 12 a packet the terminal device 23 has transmitted to the terminal device 21 and then transfers the packet to the network 11. The packet switch 100 performs a process on the received packet to an IP layer or a data link layer, and does not terminate a TCP connection.

The congestion control process of the packet switch 100 is discussed below. In the discussion that follows, it is assumed that a TCP connection is established between the terminal device 21 and the terminal device 23 and that the terminal device 21 transmits data to the terminal device 23.

Figure 3:
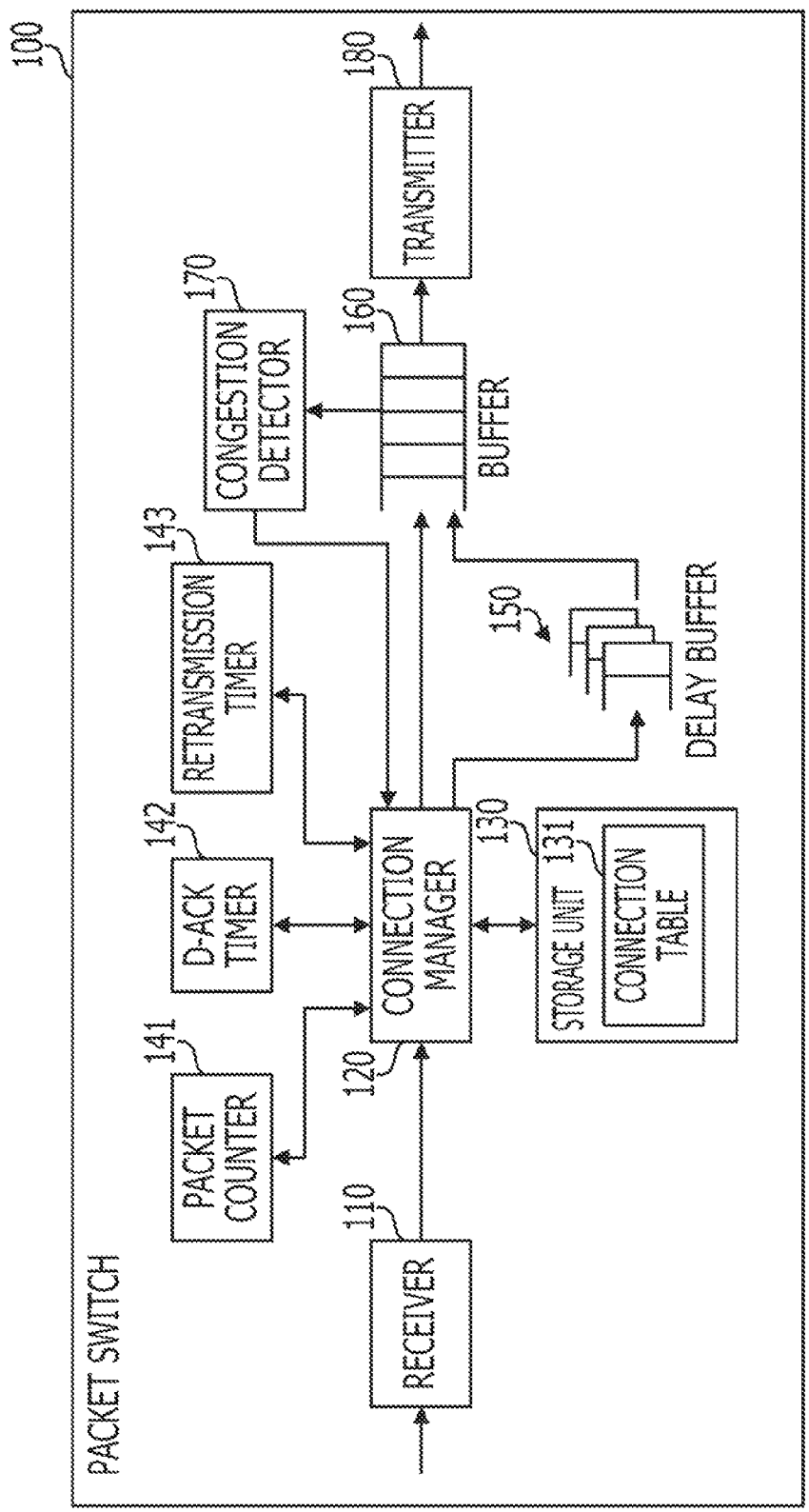
FIG. 3 illustrates a packet switch of the second embodiment.

FIG. 3 illustrates a packet switch 100 of a second embodiment. The packet switch 100 includes receiver 110, connection manager 120, storage unit 130, packet counter 141, D-ACK timer 142, retransmission timer 143, delay buffer 150, buffer 160, congestion detector 170, and transmitter 180.

The receiver 110 acquires a packet having arrived at a port connected to the network 11. The receiver 110 identifies the received packet, and then outputs the packet to the connection manager 120. The receiver 110 and the connection manager 120 perform a port determination operation S (switching operation S) in response to a destination of the packet. The detailed discussion of the switching operation S is omitted here.

If no congestion occurs, the connection manager 120 successively outputs the packets acquired from the receiver 110 to the buffer 160. If congestion occurs, the connection manager 120 monitors a TCP connection, and outputs the packet acquired from the receiver 110 to one of the delay buffer 150 and the buffer 160 in response to the connection of the packet. The connection manager 120 determines the output timing of the packet stored on the delay buffer 150, and causes the packet to be output from the delay buffer 150 to the buffer 160.

The connection helps the connection manager 120 determine the packet in response to an IP header and a TCP header of the packet. For example, the connection manager 120 determines packets having the same source IP address, destination IP address, source port number and destination port number as being the packets having the same connection. The connection identification may be performed without paying attention to one of or both of the source port number and the destination port number. In the congestion control process, the connection manager 120 may use the storage unit 130, the packet counter 141, the D-ACK timer 142, and the retransmission timer 143. The congestion control process may be described in detail below.

The storage unit 130 is a memory (a non-volatile memory, for example) storing information used in the congestion control process by the connection manager 120. The storage unit 130 stores a connection table 131. The connection table 131 registers information regarding the connection as a target of the congestion control process (connection information). The connection manager 120 adds or deletes the connection information. According to the second embodiment, the connection information is stored in a table format. Optionally, the connection information may be stored in another format.

In response to an instruction from the connection manager 120, the packet counter 141 counts the number of packets passing through the connection manager 120 on a per connection basis. A terminal device as a destination of the connection uses the packet counter 141 to predict the timing of transmission of a duplicate ACK. More specifically, if packets of a specific number (two packets, for example) have been received in a delayed ACK algorithm, an ACK is then transmitted. The packet counter 141 is thus used to predict the duplicate ACK.

The D-ACK timer 142 measures a time elapse on a per connection basis in response to an instruction from the connection manager 120. The terminal device of the packet destination uses the D-ACK timer 142 to predict the transmission timing of the duplicate ACK. In the delayed ACK algorithm, an ACK is transmitted in response to a specific time elapse from the preceding reception of a packet (if delayed ACK timeout occurs) even before the number of received packets reaches a specific number. The D-ACK timer 142 is used to predict a duplicate ACK that is expected to occur in this case.

The retransmission timer 143 measures a time elapse on a per connection basis in response to an instruction from the connection manager 120. The retransmission timer 143 is thus used to predict a retransmission timeout occurring in a terminal device as a source of the connection. More specifically, the packet is retransmitted in a retransmission algorithm if an ACK responsive to the packet is not received within the specific time from the transmission of the packet. The retransmission timer 143 is used to predict this automatic retransmission.

The packet counter 141 resets a counter for part or all of the connections in response to an instruction from the connection manager 120. The D-ACK timer 142 and the retransmission timer 143 reset timers thereof for part or all of the connections in response to an instruction from the connection manager 120.

The delay buffer 150 is a buffer memory in a queue format storing transfer-suspended packets. The delay buffer 150 includes a plurality of queues respectively corresponding to a plurality of connections. For example, one packet is stored for each connection as a target of the congestion control process. The connection manager 120 stores a packet in one of the queues on the delay buffer 150. A packet stored in any of the queues on the delay buffer 150 is output to the buffer 160 in response to an instruction from the connection manager 120.

The buffer 160 is a buffer memory in a queue format storing, temporarily, a packet waiting for transmission. The buffer 160 adds a packet acquired from one of the connection manager 120 and the delay buffer 150 onto the tail of a queue. The buffer 160 also outputs successively packets at the head of a queue to the transmitter 180. The buffer 160 may include a plurality of queues at different priority levels to perform a quality of service (QoS) process.

The congestion detector 170 monitors a quantity of packets retained in the buffer 160. If a retained packet quantity (queue length) is above a specific threshold value, the congestion detector 170 determines that congestion occurs, and notifies the connection manager 120 of the occurrence of the congestion. If the retained packet quantity is less than the threshold value, the congestion detector 170 determines that the congestion has been cleared, and then notifies the connection manager 120 of the cleared congestion. The threshold value for detecting the occurrence of the congestion and the threshold value for detecting the clearance of the congestion may be different. For example, the threshold value for detecting the clearance of the congestion may be set to be smaller than the threshold value for detecting the occurrence of the congestion.

The congestion detector 170 may set multi-level threshold values to detect the occurrence of congestion and may notify the connection manager 120 of the degree of the congestion. In such a case, the connection manager 120 may make the maximum number of connections as a target of the congestion control process proportional to the degree of congestion. For example, the threshold values may be set at three levels (level 1<level 2<level 3), and ten connections may be set as the upper limit of the congestion control process at level 1, twenty connections may be set as the upper limit of the congestion control process at level 2, and thirty connections may be set as the upper limit of the congestion control process at level 3.

The transmitter 180 successively retrieves the packets from the buffer 160, and outputs the packets to a port connected to the network 12.

The connection manager 120, the packet counter 141, the D-ACK timer 142, and the retransmission timer 143 may be considered as an example of the congestion controller 1b of the first embodiment. The delay buffer 150 may be considered as the buffer 1a of the first embodiment.

The packet communication forwarded from the network 11 to the network 12 has been discussed. The packet communication forwarded from the network 12 to the network 11 is performed using the same structure as the structure illustrated in FIG. 3.

Figure 4:
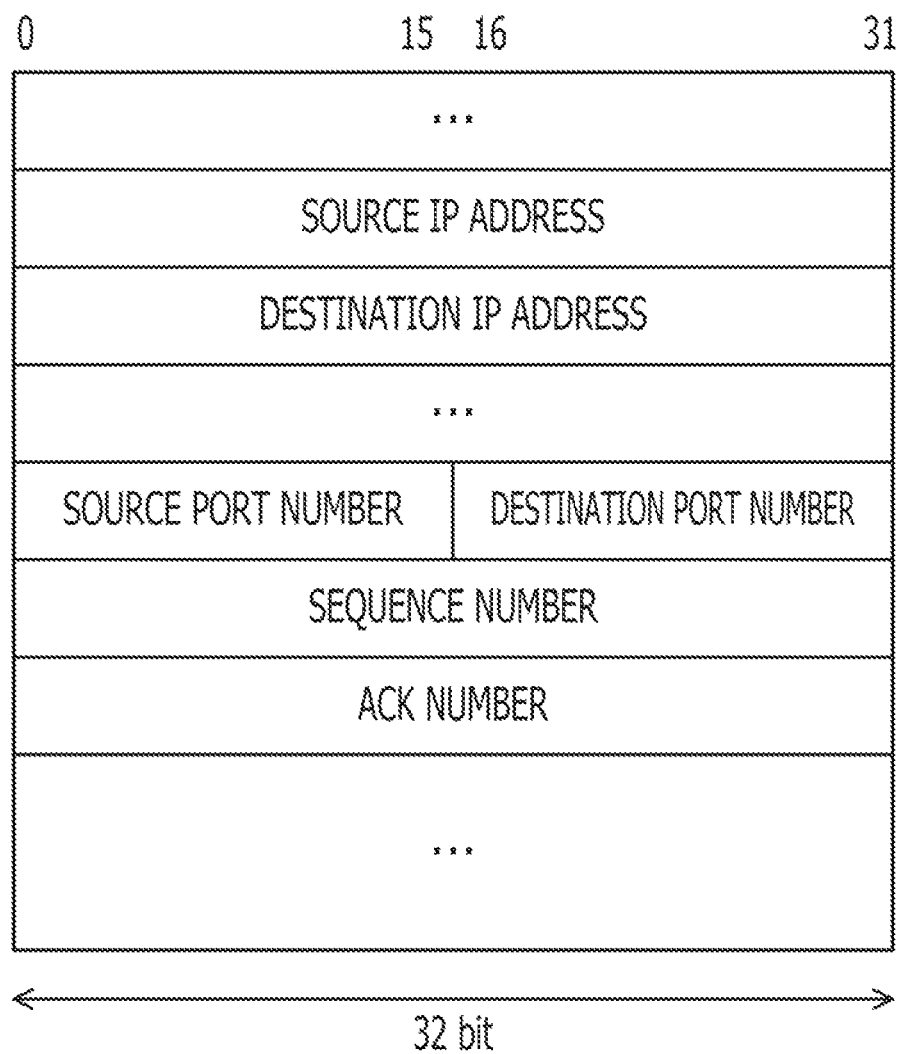
FIG. 4 illustrates a structure of a packet of the first embodiment.

FIG. 4 illustrates a structure of a packet of the second embodiment. A packet used in the packet communication of the second embodiment includes an IP header and a TCP header. The IP header includes a source IP address of 32 bits, and a destination IP address of 32 bits. The TCP header includes a source port number of 16 bits, a destination port number of 16 bits, a sequence number of 32 bits, and an ACK number of 32 bits.

The sequence numbers are attached to a series of packets in the ascending order, i.e., the order of the transmission on a terminal device operating as a source. A retransmission packet is assigned the same sequence number as the sequence number of the original packet. The ACK number is a number of the last packet to which normal reception was performed, and the ACK number results from adding one to the last sequence number of the normally received packet.

FIG. 5 illustrates a structure of a connection table 131 of the second embodiment. The connection table 131 is stored on the storage unit 130 as previously discussed. The connection table 131 lists parameters including a buffer number, a source IP address, a source port number, a destination IP address, a destination port number, and a duplicate ACK, for example. The parameters horizontally arranged at the same row are mutually mapped to each other in FIG. 5.

The buffer number identifies a queue on the delay buffer 150. The source IP address, the source port number, the destination IP address, and the destination port number are information identifying a connection, and correspond to information included in the IP header and the TCP header of the packet. The duplicate ACK is an estimated value of the number of duplicate ACKs returned from a destination terminal device to a source terminal device. The default value of the duplicate ACK is zero. The number of duplicate ACKs is predicted by the connection manager 120 and written on the connection table 131.

Connection information registered on the connection table 131, for example, may be buffer number=1, IP address=11.22.33.XX (IP address of the terminal device 21), source port number=2920, destination IP address=55.66.77.XX (IP address of the terminal device 23), destination port number=80, and duplicate ACK=1. The connection information may mean that a packet transmitted from the terminal device 21 to the terminal device 23 is stored in a first queue on the delay buffer 150 and that the duplicate ACK has been transmitted once from the terminal device 23 to the terminal device 21 in order not to transfer the packet.

Figure 6:
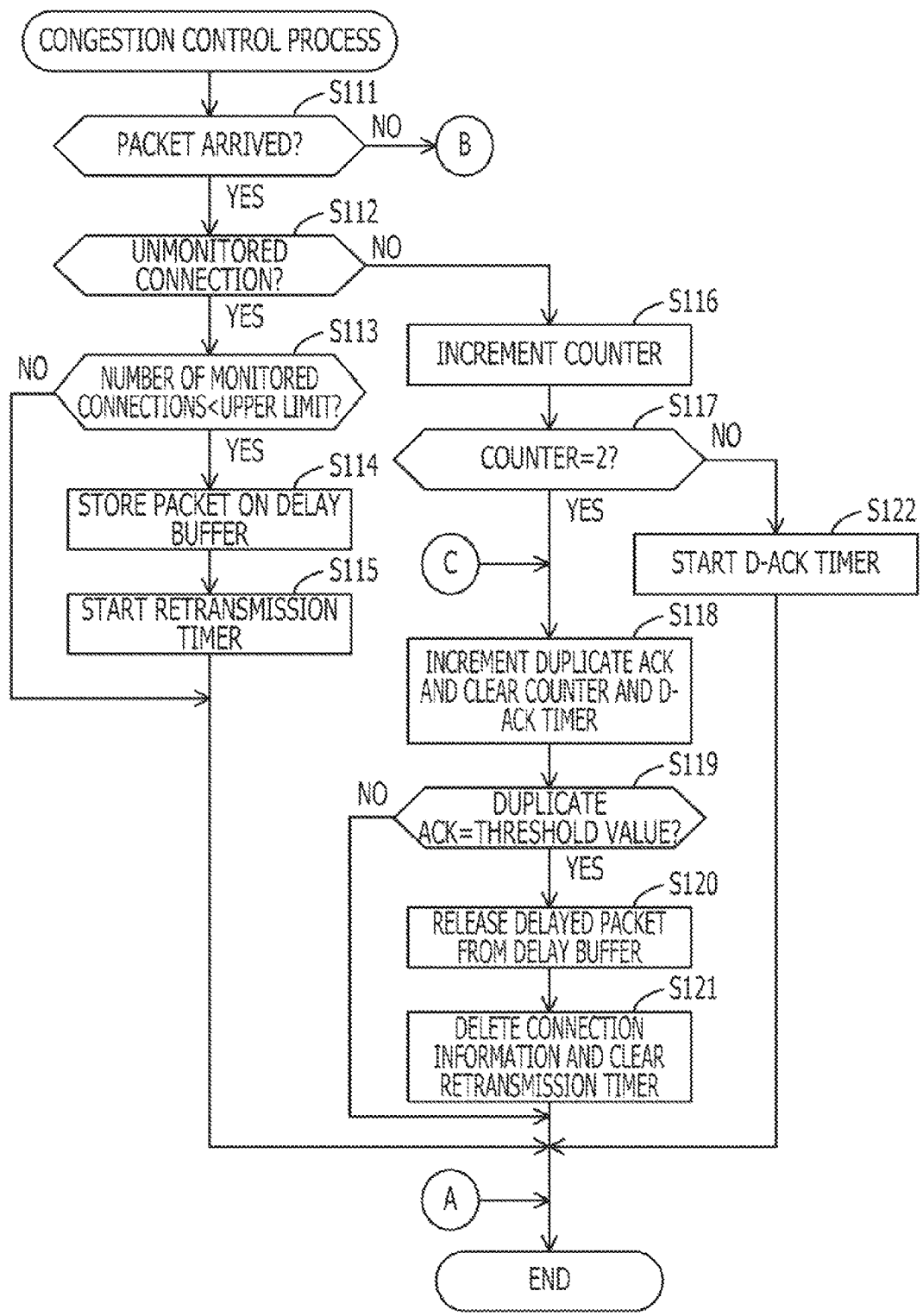
FIG. 6 illustrates a congestion control process of the second embodiment.

FIG. 6 illustrates the congestion control process of the second embodiment. The congestion control process is repeated by the packet switch 100 subsequent to the detection of an occurrence of congestion. The congestion control process is described below with reference to operation numbers of FIG. 6.

Operation S111: The connection manager 120 determines whether a packet has arrived (has been received from the receiver 110). If a packet has arrived, processing proceeds to operation S112. If no packet has arrived, processing proceeds to operation S123 in FIG. 7.

Operation S112: The connection manager 120 verifies the connection information of the arrival packet (the source IP address, the destination IP address, the source port number, and the destination port number). The connection manager 120 then determines whether a connection of the arrival packet is unmonitored, i.e., determines whether the verified connection information is unregistered in the connection table 131. If the connection of the arrival packet is unmonitored, processing proceeds to operation S113. If the connection of the arrival packet is monitored, the connection manager 120 outputs the packet to the buffer 160. Processing proceeds to operation S116.

Operation S113: The connection manager 120 references the connection table 131, and determines whether the number of monitored connections is less than an upper limit. If the number of monitored connection is less than the upper limit, processing proceeds to operation S114. If the number of connections reaches the upper limit, the connection manager 120 outputs the packet to the buffer 160 and ends the process. The maximum number of monitored connections may be a value responsive to the number of retained packets on the buffer 160, or may be a fixed value.

Operation S114: The connection manager 120 stores an arrival packet in an empty queue on the delay buffer 150 rather than storing the packet on the buffer 160. The connection manager 120 registers the connection information verified in operation S112 in the connection table 131.

Operation S115: The retransmission timer 143 starts the timer thereof for the connection identified in operation S112. Processing thus ends. Timeout time of the retransmission timer 143 is determined taking into consideration a retransmission timeout time in the retransmission algorithm.

Operation S116: The packet counter 141 increments by one a counter section corresponding to the connection identified in operation S112. The default value of the counter is zero.

Operation S117: The connection manager 120 determines whether the counter incremented in operation S116 reaches 2. If the counter reaches 2, processing proceeds to operation S118. If the counter is yet to reach 2 (i.e., the counter remains at 1), processing proceeds to operation S122.

Operation S118: The connection manager 120 increments the number of duplicate ACKs corresponding to the connection identified in operation S112 and registered in the connection table 131. The packet counter 141 then clears the counter section corresponding to the connection (defaults the counter section to zero). The D-ACK timer 142 clears the timer section thereof corresponding to the connection (i.e., stops and defaults the timer section).

Operation S119: The connection manager 120 determines whether the number of duplicate ACKs has reached a threshold value (2, for example) as a result of incrementing the number of duplicate ACKs in operation S118. If the number of duplicate ACKs reaches the threshold value, processing proceeds to operation S120. If the number of duplicate ACKs is less than the threshold value, processing ends.

Operation S120: The connection manager 120 causes the packet of the connection identified in operation S112 to be output from the delay buffer 150 to the buffer 160.

Operation S121: The connection manager 120 deletes from the connection table 131 the connection information of the packet released in operation S120, and clears the retransmission timer corresponding to the connection. Processing thus ends.

Operation S122: The D-ACK timer 142 starts the timer thereof corresponding to the connection identified in operation S112. Processing thus ends. The timeout time of the D-ACK timer 142 corresponds to delayed ACK timeout time in the delayed ACK algorithm (200 ms, for example).

Figure 7:
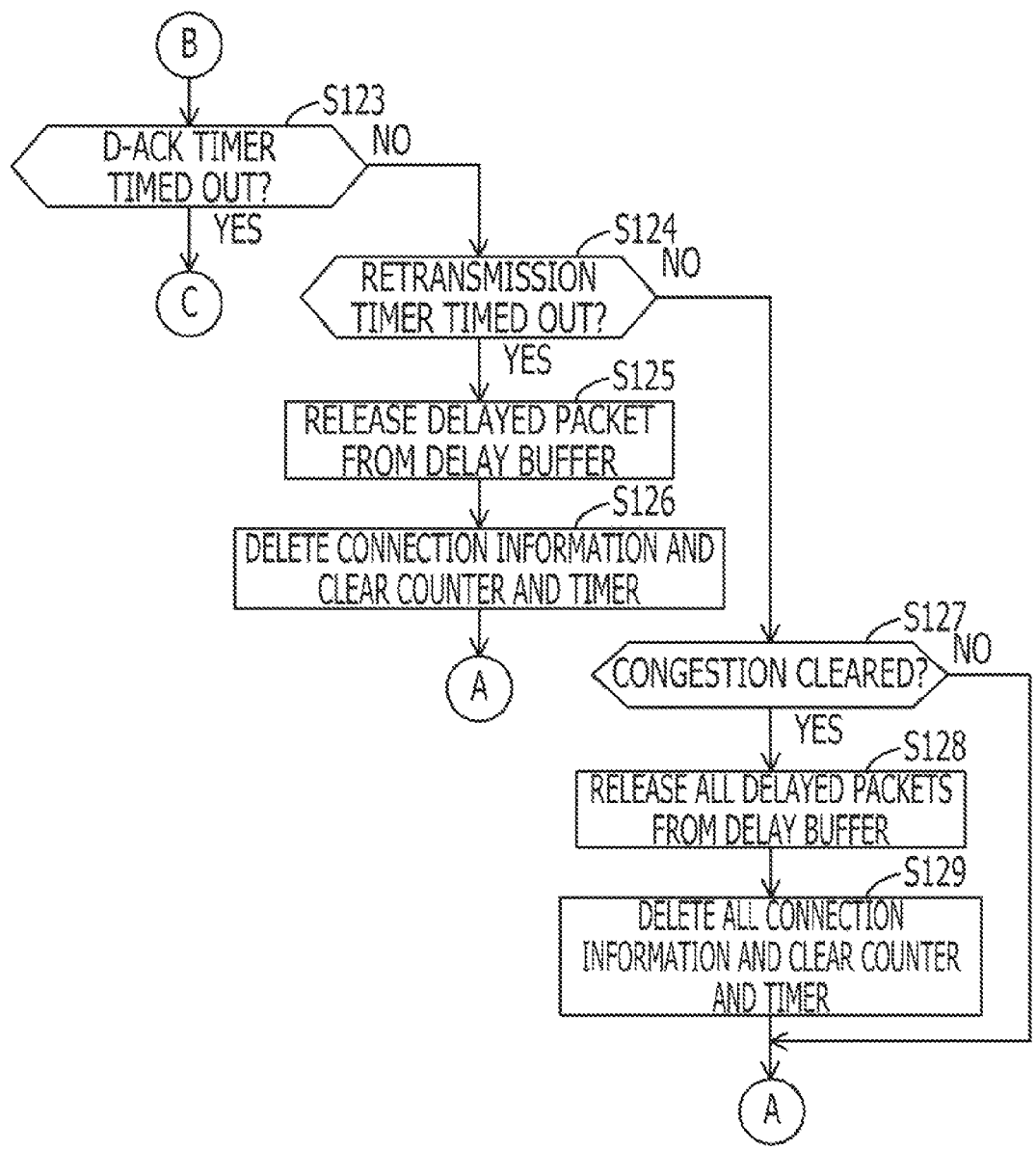
FIG. 7 illustrates a continuation of the congestion control process of FIG. 6.

FIG. 7 also illustrates a continuation of the congestion control process of the second embodiment.

Operation S123: The connection manager 120 determines whether a timeout notification has been received from the D-ACK timer 142, i.e., determines whether any timer of the D-ACK timer 142 has timed out. If the D-ACK timer 142 has timed out, processing proceeds to operation S118. Operation S118-121 are performed on the connection where a timeout has occurred. If the D-ACK timer 142 has not timed out, processing proceeds to operation S124.

Operation S124: The connection manager 120 determines whether a timeout notification has been received from the retransmission timer 143, i.e., determines whether any timer of the retransmission timer 143 has timed out. If a timeout has occurred, processing proceeds to operation S125. If no timeout has occurred, processing proceeds to operation S127.

Operation S125: The connection manager 120 causes a packet of a timeout connection stored on the delay buffer 150 to be output from the delay buffer 150 to the buffer 160.

Operation S126: The connection manager 120 deletes from the connection table 131 the connection information of the packet released in operation S125. The packet counter 141 clears the counter section corresponding to the connection. The D-ACK timer 142 and the retransmission timer 143 clear the timers corresponding to the connection. Processing thus ends.

Operation S127: The connection manager 120 determines whether the congestion has been cleared (whether a notification of a clearance of the congestion has been received from the congestion detector 170). If the congestion has been cleared, processing proceeds to operation S128. If the congestion has not been cleared, processing ends.

Operation S128: The connection manager 120 causes all the packets stored on the delay buffer 150 to be output to the buffer 160.

Operation S129: The connection manager 120 deletes all the connection information from the connection table 131. The packet counter 141 clears all the counter sections, and the D-ACK timer 142 and the retransmission timer 143 clears all the timer sections thereof.

If any congestion occurs, the packet switch 100 stores a packet of at least one connection on the delay buffer 150 and then suspends the transfer of the packet. A subsequent packet having the same connection as the connection of the reserved packet is caused to pass. The packet is released at the timing that does not cause the retransmission of the retained packet.

If a normal ACK is not received within the retransmission timeout time from the transmission of the packet, the source terminal device of the packet retransmits the packet. For this reason, the packet switch 100 releases the packet accounting for the retransmission timeout time. Upon receiving duplicate ACKs of a specific number (three ACKs, for example) from the destination terminal device, the source terminal device retransmits the packet. The packet switch 100 thus estimates the number of duplicate ACKs based on the number of passes of subsequent packets and arrival time intervals of the packets, and then releases the packets.

FIGS. 6 and 7 illustrate an example of the congestion control process. The same congestion control process may be performed even if the congestion control process is reversed from the order of operation S114 to operation S115 to the order of operation S115 and operation S114, from the order of operation S120 to operation S121 to the order of operation S121 to operation S120, from the order of operation S125 to operation S126 to the order of operation S126 to operation S125, and from the order of operation S128 to operation S129 to the order operation S129 to operation S128. Determination operation S111, 123, 124, and 127 may be performed in parallel or in any order.

The terminal device 21 may transmit data to the terminal device 23 with a connection established therebetween when congestion occurs in the packet switch 100. The flow of packets in such a case is described below.

Figure 8:
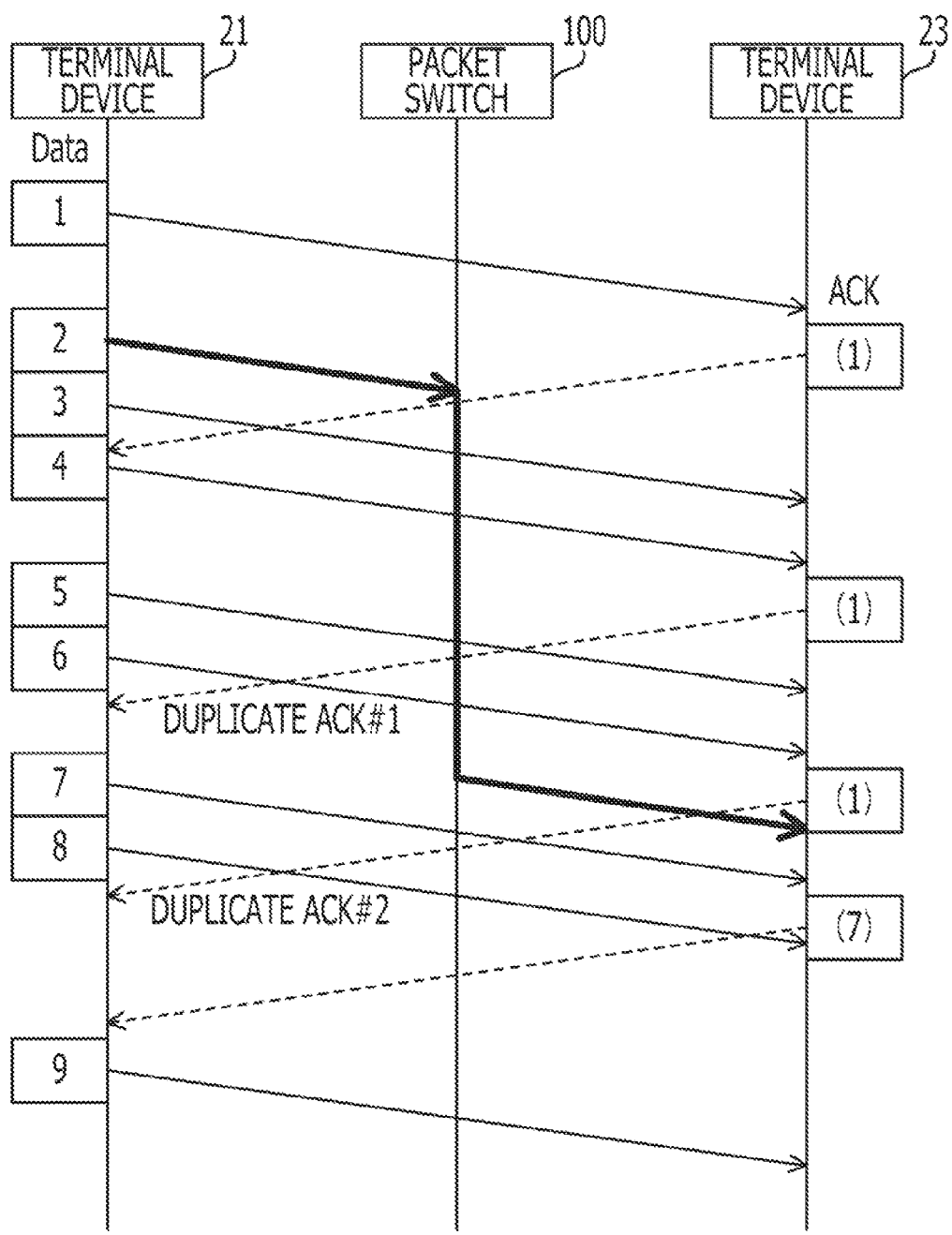
FIG. 8 illustrates a first sequence of a release timing of a delayed packet.

FIG. 8 illustrates a first sequence chart illustrating a release timing of a delayed packet. As illustrated in FIG. 8, the terminal device 21 transmits packets #1-#9 to the terminal device 23.

The packet #1 arrives at the terminal device 23 via the packet switch 100. In response to the reception of the packet #1, an ACK packet (ACK #1) indicating a normal reception of the packet #1 is transmitted from the terminal device 23 to the terminal device 21.

The transfer of the packet #2 is suspended by the packet switch 100. Subsequent packets #3 and #4 take over and get ahead of the packet #2, and then arrives at the terminal device 23. In the discussion here, it is assumed that the interval between the packet #3 and the packet #4 is shorter than a delayed ACK timeout time (e.g., 200 ms) of the terminal device 23. The packets #3 and #4 have been received on the terminal device 23 while the packet #2 has not arrived. For this reason, a duplicate ACK packet (ACK #1) indicating a normal reception up to the packet #1 is transmitted from the terminal device 23 to the terminal device 21.

The terminal device 23 detects the pass of the packet #3, and then detects the pass of the packet #4 within the delayed ACK timeout time from the pass of the packet #3. The number of duplicate ACKs is estimated to be one.

Subsequent packets #5 and #6 take over and get ahead of the packet #2 and arrive at the terminal device 23. It is assumed here that the time interval between the packet #5 and the packet #6 is shorter than the delayed ACK timeout time. Since the two packets #5 and #6 have been received with the packet #2 not arriving, the duplicate ACK (ACK #1) is transmitted from the terminal device 23 to the terminal device 21.

The packet switch 100 detects the pass of the packet #5 and then detects the pass of the packet #6 within the delayed ACK timeout time from the pass of the packet #5. The number of duplicate ACKs is estimated to be two. Since the terminal device 21 is designed to retransmit the packet #2 in response to the reception of three duplicate ACKs, the packet #2 is released after the pass of the packet #6.

The packet #7 arrives normally at the terminal device 23. At this point of time, packets #1-#7 have normally been received. An ACK packet (ACK #7) indicating the packets up to the packet #7 have been normally received is transmitted from the terminal device 23 to the terminal device 21.

Upon detecting the pass of the packet #6 that may trigger the transmission of the second duplicate ACK from the terminal device 23 to the terminal device 21, the packet switch 100 releases the packet #7 before the next packet #7 having the same connection passes therethrough. This arrangement avoids transmitting the third duplicate ACK from the terminal device 23 to the terminal device 21 and restricts the retransmission of the packet #2. Since the terminal device 21 receives the ACK responsive to the packet #2 with a time delay, the transmission rate is reduced.

Figure 9:
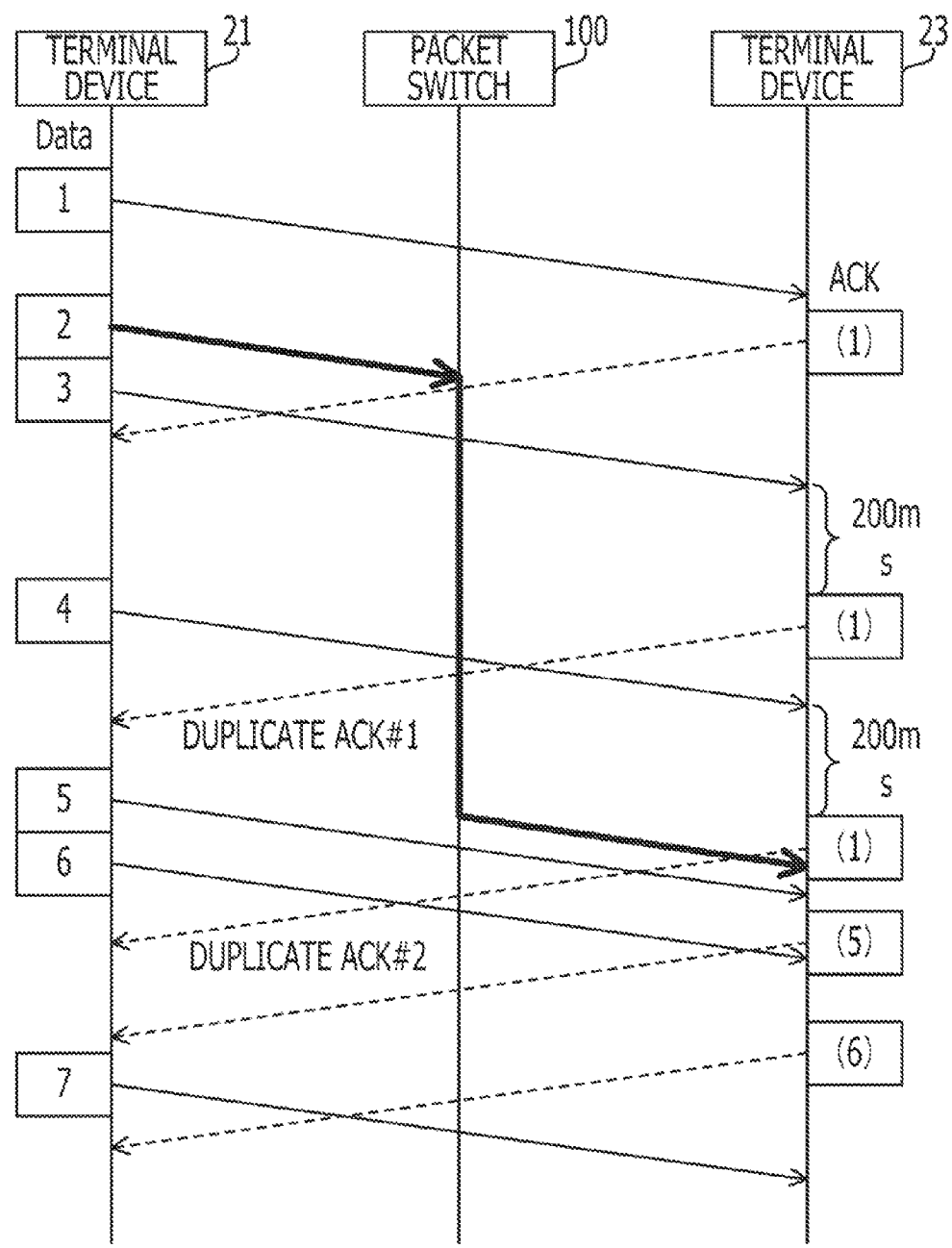
FIG. 9 illustrates a second sequence of the release timing of the delayed packet.

FIG. 9 illustrates a second sequence chart of the release timing of a delayed packet. As illustrated in FIG. 9, the terminal device 21 transmits packets #1-#7 to the terminal device 23. The transmission of the packets #1 and #2 remains unchanged from the transmission of the packets #1 and #2 illustrated in FIG. 8.

The packet #3 takes over and gets ahead of #2, and arrives at the terminal device 23. It is assumed here that the time interval between the packet #3 and the packet #4 is longer than the delayed ACK timeout time of the terminal device 23 (e.g., 200 ms). The packet #3 has been received with the packet #2 retained and a delayed ACK timeout occurs. The terminal device 23 transmits the duplicate ACK (ACK #1) to the terminal device 21 without waiting for the packet #4.

The packet switch 100 detects the pass of the packet #3, and the D-ACK timer 142 then times out. The number of duplicate ACKs is estimated to be one before the pass of the packet #4.

The packet #4 then arrives at the terminal device 23 after getting ahead of the packet #2. It is assumed here that the time interval between the packet #4 and the next packet #5 is longer than the delayed ACK timeout time of the terminal device 23. The packet #4 has been received with the packet #2 retained and a delayed ACK timeout occurs. The terminal device 23 transmits the duplicate ACK (ACK #1) to the terminal device 21 without waiting for the packet #5.

The packet switch 100 detects the pass of the packet #4 and the D-ACK timer 142 times out. The number of duplicate ACKs is estimated to be two before the pass of the packet #5. Since the terminal device 21 is designed to retransmit the packet #2 in response to the reception of three duplicate ACKs, the packet #2 is released after the D-ACK timer 142 times out with the packet #4 passed.

The packet #5 arrives normally at the terminal device 23. At this point of time, packets #1-#5 have normally been received. An ACK packet (ACK #5) indicating the packets up to the packet #5 have been normally received is transmitted from the terminal device 23 to the terminal device 21.

Upon detecting the duplicate ACK timeout that may trigger the transmission of the second duplicate ACK from the terminal device 23 to the terminal device 21 after the pass of the packet #4, the packet switch 100 releases the packet #2 before the next packet #5 having the same connection passes therethrough. This arrangement avoids transmitting a third duplicate ACK from the terminal device 23 to the terminal device 21 and restricts the retransmission of the packet #2. Since the terminal device 21 receives the ACK responsive to the packet #2 with a time delay, the transmission rate is reduced.

Figure 10:
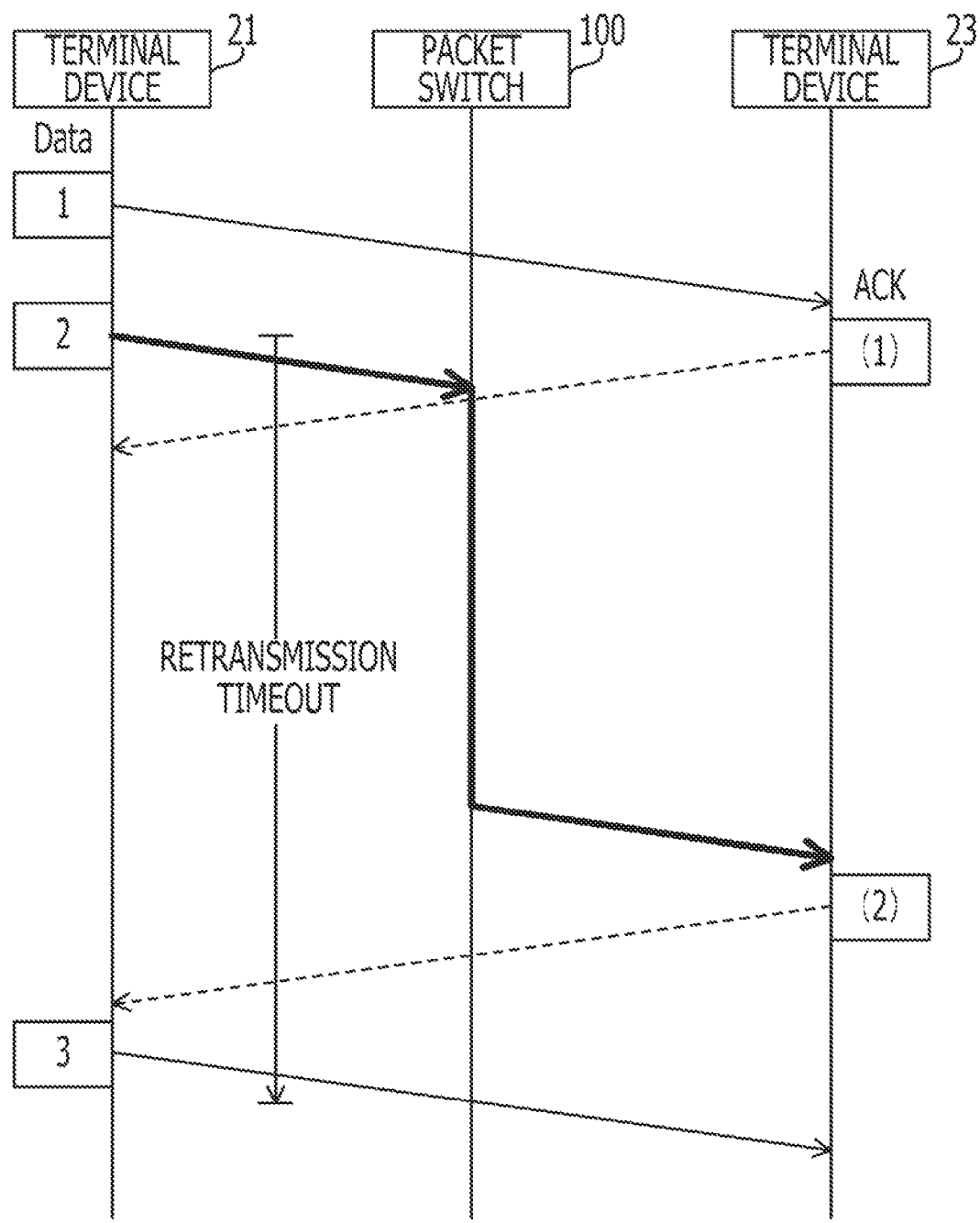
FIG. 10 is a third sequence of the release timing of the delayed packet.

FIG. 10 illustrates a third sequence chart of the release timing of a delayed packet. As illustrated in FIG. 10, the terminal device 21 transmits packets #1-#3 to the terminal device 23. The transmission of the packets #1 and #2 remains unchanged from the transmission of the packets #1 and #2 of FIGS. 8 and 9.

It is assumed here that the terminal device 21 does not transmit the packet #3 after the transmission of the packet #2 until an ACK is received in response to the packet #2. The retransmission timer 143 times out with the estimated number of duplicate ACKs being zero, and the packet #2 is released. The terminal device 21 thus avoids generating a retransmission timeout and restricts the retransmission of the packet #2. Since the terminal device 21 receives the ACK responsive to the packet #2 with a time delay, the transmission rate is reduced.

If congestion occurs in the packet switch 100 in the communication system of the second embodiment, the transmission rate of the connection through the packet switch 100 is lowered, and the congestion is alleviated. The generation of the congestion is controlled, and a decrease in the network communication efficiency is controlled. The packet switch 100 delays the packet transfer as much as possible but to within a range where no retransmission occurs. The arrangement of the embodiment is applicable to a complex retransmission algorithm such as a high-speed retransmission mechanism of TCP.

The packet switch 100 may adjust the number of connections as a target of the congestion control process depending on the level of congestion. The more severe the congestion, the larger the number of connections is set to be as a target of the congestion control process. The congestion state is thus quickly cleared.

Third Embodiment

A third embodiment is described below. The discussion that follows focuses a difference between the third embodiment and the second embodiment, and the discussion of a similarity therebetween is omitted as appropriate. The communication system of the third embodiment dynamically modifies parameters used to determine the release timing of a retained packet. The parameters include a threshold value on the number of duplicate ACKs, timeout time of the D-ACK timer, and timeout time of the retransmission timer.

The communication system of the third embodiment is substantially identical in structure to the communication system of the second embodiment of FIG. 2. In the third embodiment, however, a packet switch 200 is substituted for the packet switch 100. The packet switch 200 is described below.

Figure 11:
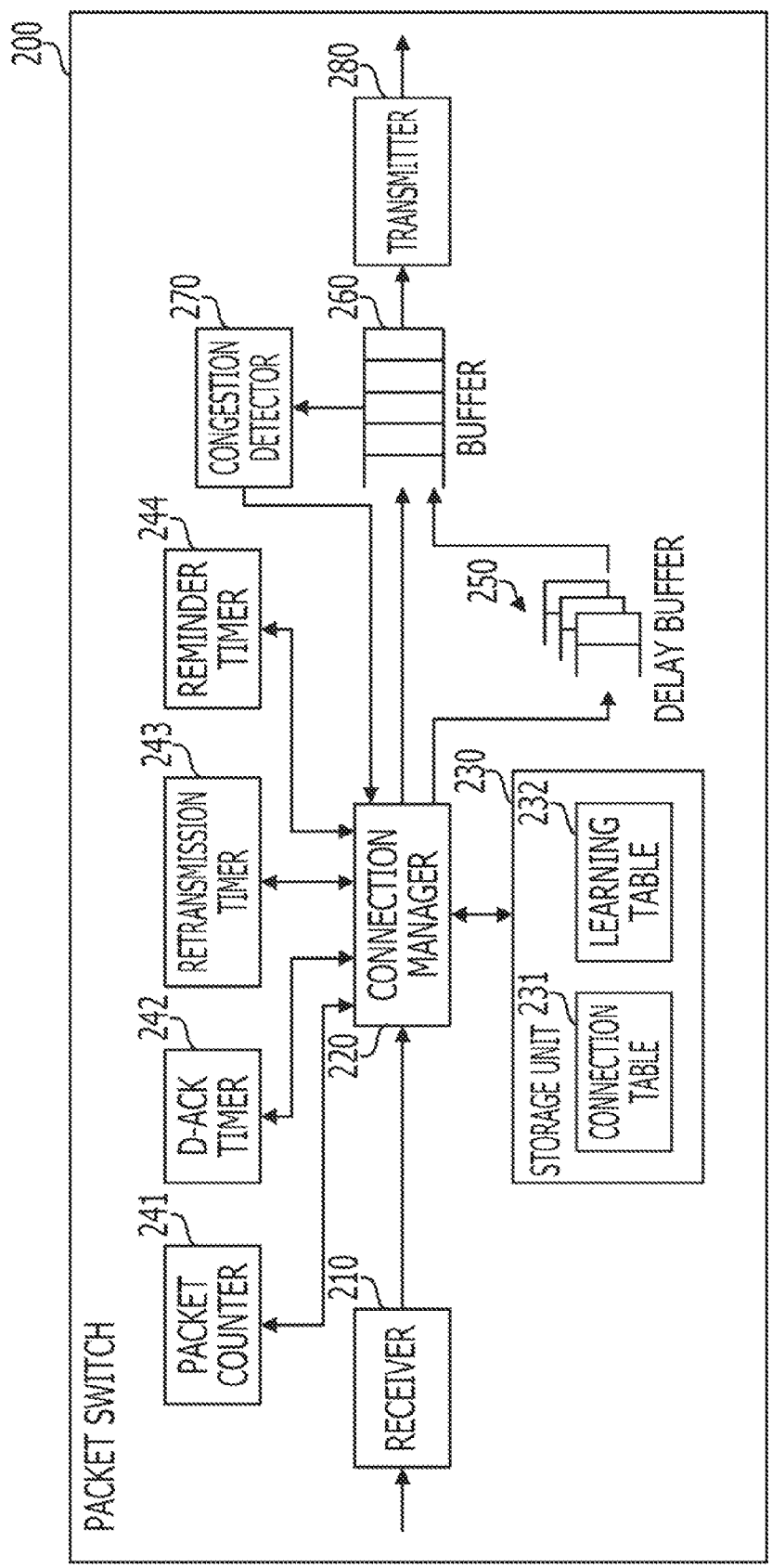
FIG. 11 illustrates a packet switch of the third embodiment.

FIG. 11 illustrates the packet switch 200 of the third embodiment. The packet switch 200 includes receiver 210, connection manager 220, storage unit 230, packet counter 241, D-ACK timer 242, retransmission timer 243, reminder timer 244, delay buffer 250, buffer 260, congestion detector 270, and transmitter 280.

The receiver 210, the packet counter 241, the D-ACK timer 242, the retransmission timer 243, the delay buffer 250, the buffer 260, the congestion detector 270, and the transmitter 280 are identical in operation S to the counterparts having the respective reference numerals, 110, 141, 142, 143, 150, 160, 170 and 180 in the second embodiment.

As the connection manager 120 of the second embodiment, the connection manager 220 monitors a TCP connection during the occurrence of congestion. The connection manager 220 controls the retainment of the acquired packet and the release of the retained packet. The connection manager 220 further monitors whether a retransmission packet corresponding to the retained packet has passed. If the retransmission packet is detected, the connection manager 220 corrects the parameter to determine the release timing of the retained packet.

The retransmission packet may be detected subsequent to the release of the retained packet. The connection manager 220 does not immediately delete the connection information of the released packet from the connection table 231 but deletes the connection information of the released packet after a specific time elapse from the release of the packet.

The storage unit 230 stores information for use in the congestion control process of the connection manager 220. The storage unit 230 stores a connection table 231 and a learning table 232. Information regarding the connection as a target of the congestion control process is registered in the connection table 231. A corrected parameter is registered for each connection as a target of the congestion control process on the learning table 232.

The reminder timer 244 measures the time elapse on a per connection basis in response to an instruction from the connection manager 220. The reminder timer 244 is used to determine the timing, at which the connection information of the released packet is deleted from the connection table 231, after the release of the packet from the delay buffer 250. In response to an instruction from the connection manager 220, the reminder timer 244 resets the timer of part or all of the connections.

FIG. 12 illustrates a connection table of the third embodiment. The connection table 231 is stored on the storage unit 230 as described previously. The connection table 231 lists parameter items such as the buffer number, the source IP address, the source port number, the destination IP address, the destination port number, the duplicate ACK, and the sequence number, for example. The parameters horizontally arranged at the same row in FIG. 12 are mutually mapped to each other.

The buffer number, the source IP address, the source port number, the destination IP address, the destination port number, and the duplicate ACK are identical to those of the counterparts in the connection table 131 of the second embodiment illustrated in FIG. 5. Listed in the sequence number item are sequence numbers written on the TCP headers stored on the delay buffer 250. If the connection manager 220 acquires a packet having the same sequence number, that packet is determined as a retransmission packet stored on the delay buffer 250.

FIG. 13 illustrates a structure of the learning table 232 of the third embodiment. The learning table 232 is stored on the storage unit 230 as previously discussed. The learning table 232 includes parameter items of the source IP address, the source port number, the destination IP address, the destination port number, the duplicate ACK, the D-ACK timer, and the retransmission timer. The parameters horizontally arranged at the same row in FIG. 13 are mutually mapped to each other.

The source IP address, the source port number, the destination IP address, and the destination port number are identical to those of the counterparts in the connection table 231. Listed in the parameter item of the duplicate ACK are threshold values used to determine from the number of duplicate ACKs whether to release the retained packet. Listed in the parameter item of the D-ACK timer are timeout times of the D-ACK timer 242. Listed in the parameter item of the retransmission timer are timeout times of the retransmission timer 243. In this way, the threshold value on the duplicate ACK and the timeout time are corrected on a per connection basis.

With reference to FIG. 13, the corrected parameters (the duplicate ACK, the D-ACK timer, and the retransmission timer) are applied to the connection having the same source IP address, source port number, destination IP address, and destination port number. Optionally, the corrected parameters may be applied without paying attention to one or both of the source port number and the destination port number. This method is effective if the threshold value of the duplicate ACK is set on a per terminal device basis rather than on a per port basis, for example.

Figure 14:
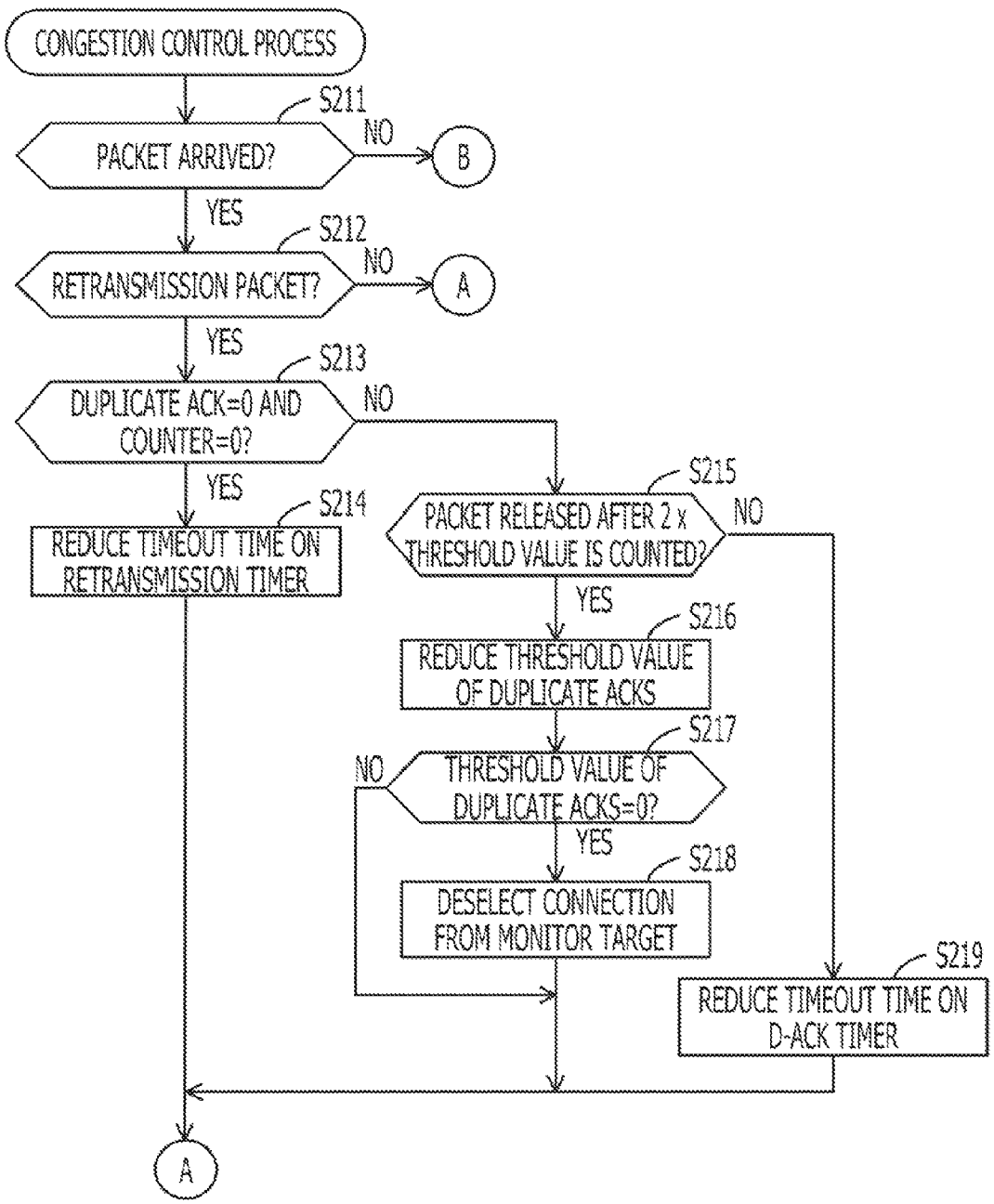
FIG. 14 illustrates a congestion control process of the third embodiment.

FIG. 14 illustrates the congestion control process of the third embodiment. The packet switch 200 repeatedly performs the congestion control process subsequent to the detection of congestion. The congestion control process is described in detail below with reference to operation numbers of FIG. 14.

The connection manager 220 determines whether a packet has arrived (Operation S211). If a packet has arrived, processing proceeds to operation S212. If no packet has arrived, processing proceeds to operation S231.

The connection manager 220 verifies the connection information of the arrival packet (the source IP address, the source port number, the destination IP address, and the destination port number), and the sequence number (Operation S212). The connection manager 220 determines whether the arrival packet is a retransmission packet, i.e., whether the verified connection information and sequence number are registered in the connection table 231. If the arrival packet is a retransmission packet, processing proceeds to operation S213. If the arrival packet is not a retransmission packet, processing proceeds to operation S220.

The connection manager 220 determines whether the connection identified in operation S212 indicates "0" as the number of duplicate ACKs and "0" for the packet counter 241 (Operation S213). If this condition is satisfied, processing proceeds to operation S214. If this condition is not satisfied, processing proceeds to operation S215.

The connection manager 220 reduces the timeout time on the retransmission timer 243 by a specific time in the connection identified in operation S212 (Operation S214). The corrected timeout time is then written on the learning table 232. Processing proceeds to operation S220.

The connection manager 220 determines whether a release operation of the original packet of the arrival retransmission packet is performed after the packet counter 241 counts subsequent packets of the number equal to the threshold value of the duplicate ACKs multiplied by 2 (Operation S215). If the release operation is performed, processing proceeds to operation S216. If the release operation is not performed, processing proceeds to operation S219.

The connection manager 220 decrements the threshold value of the duplicate ACK (by one) in the connection identified in operation S212 (Operation S216). The corrected threshold value of the duplicate ACKs is written in the learning table 232.

The connection manager 220 determines whether threshold value of the duplicate ACKs after being corrected in operation S216 is zero (Operation S217). If the threshold value is zero, processing proceeds to operation S218. If the threshold value is not zero, processing proceeds to operation S220.

The connection manager 220 deselects the connection identified in operation S212 from the targets of the congestion control process (Operation S218). The connection hereinafter remains deselected as the target of the congestion control process. Processing proceeds to operation S220.

The connection manager 220 reduces the timeout time on the D-ACK timer 242 by a specific time in the connection identified in operation S212 (Operation S219). The corrected timeout time is written in the learning table 232. Processing proceeds to operation S220.

Figure 15:
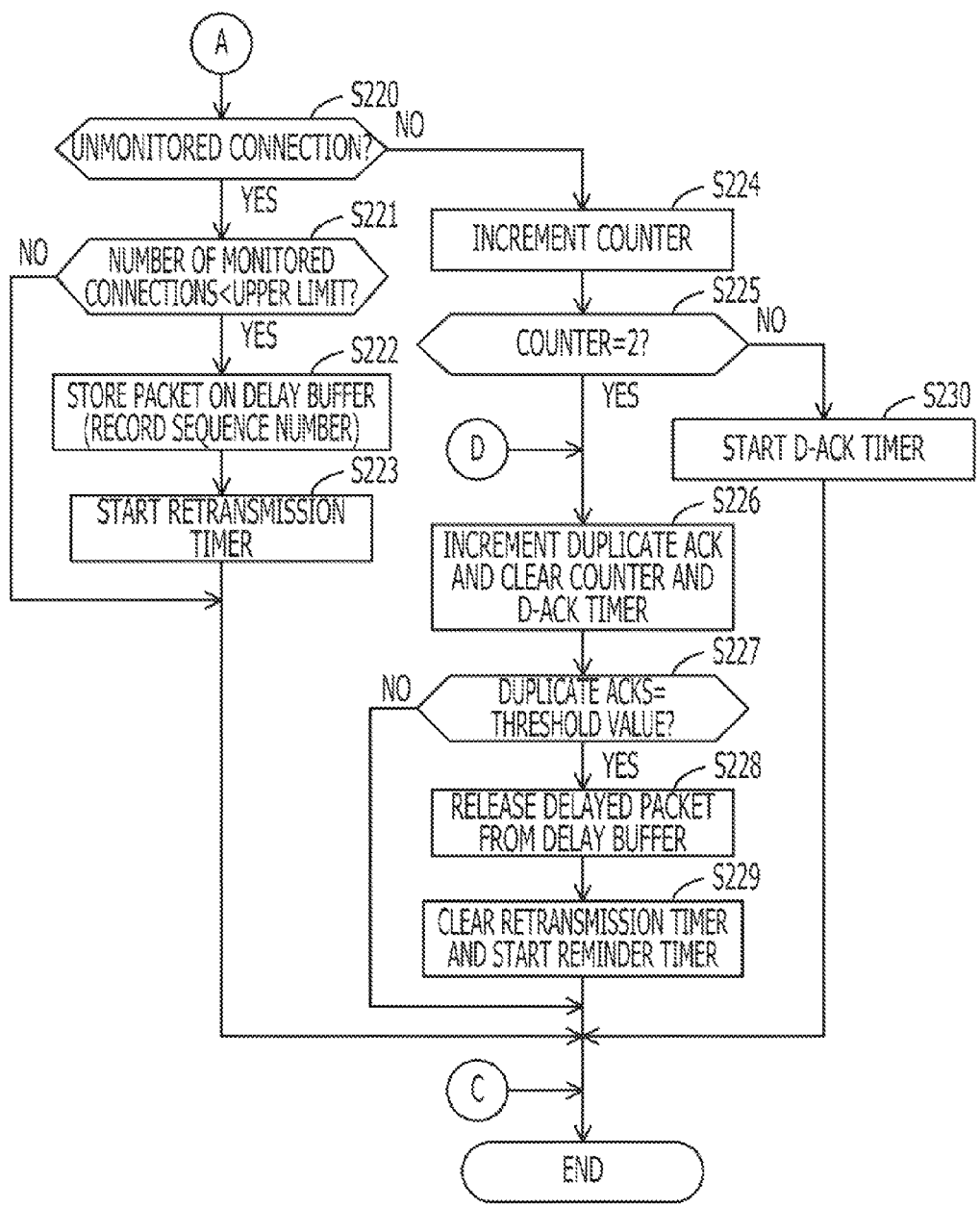
FIG. 15 illustrates a continuation of the congestion control process of FIG. 14.

FIG. 15 illustrates a continuation of the congestion control process of the third embodiment.

The connection manager 220 determines whether the connection of the arrival packet is unmonitored (Operation S220). If the connection of the arrival packet is unmonitored, processing proceeds to operation S221. If the connection of the arrival packet is monitored, the connection manager 220 outputs the packet to the buffer 260. Processing proceeds to operation S224.

The connection manager 220 determines whether the number of monitored connections is less than an upper limit (Operation S221). If the number of monitored connections is less than the upper limit, processing proceeds to operation S222. If the number of monitored connections reaches the upper limit, the connection manager 220 outputs the packet to the buffer 260, and ends the process.

The connection manager 220 stores the arrival packet in an empty queue on the delay buffer 250 rather than outputs the arrival packet to the buffer 260 (Operation S222). The connection information verified in operation S212 and the sequence number are registered in the connection table 231.

The retransmission timer 243 starts the timer corresponding to the connection identified in operation S212 (Operation S223). The timeout time is the corrected value if the connection is registered in the learning table 232 and is the specified value if the connection is not registered.

The packet counter 241 increments the counter section corresponding to the connection identified in operation S212 (Operation S224).

The connection manager 220 determines whether the counter has reached 2 as a result of incrementing of operation S224 (Operation S225). If the counter has reached 2, processing proceeds to operation S226. If the counter has not reached 2, processing proceeds to operation S230.

The connection manager 220 increments the number of duplicate ACKs of the connection identified in operation S212 (Operation S226). The packet counter 241 clears the counter section corresponding to the connection. The D-ACK timer 242 clears the timer section corresponding to the connection.

The connection manager 220 determines whether the number of duplicate ACKs has reached the threshold value as a result of incrementing the number of duplicate ACKs in operation S226 (Operation S227). The threshold value is the corrected value if the connection is registered in the learning table 232 and is the specified value if the connection is not registered. If the number of duplicate ACKs has reached the threshold value, processing proceeds to operation S228. If the number of duplicate ACKs is less than the threshold value, processing ends.

The connection manager 220 outputs the packet identified in operation S212 and stored on the delay buffer 250 from the delay buffer 250 to the buffer 260 (Operation S228).

The retransmission timer 243 clears the timer section corresponding to the connection identified in operation S212 (Operation S229). The reminder timer 244 starts the timer corresponding to the connection identified in operation S212. The timeout time of the reminder timer 244 is given in view of a maximum delay time from the transmission of the original packet to the transmission of the retransmission packet.

The D-ACK timer 242 starts the timer corresponding to the connection identified in operation S212 (Operation S230). The timeout time is the corrected value if the connection is registered in the learning table 232 and is the specified value if the connection is not registered. Processing thus ends.

Figure 16:
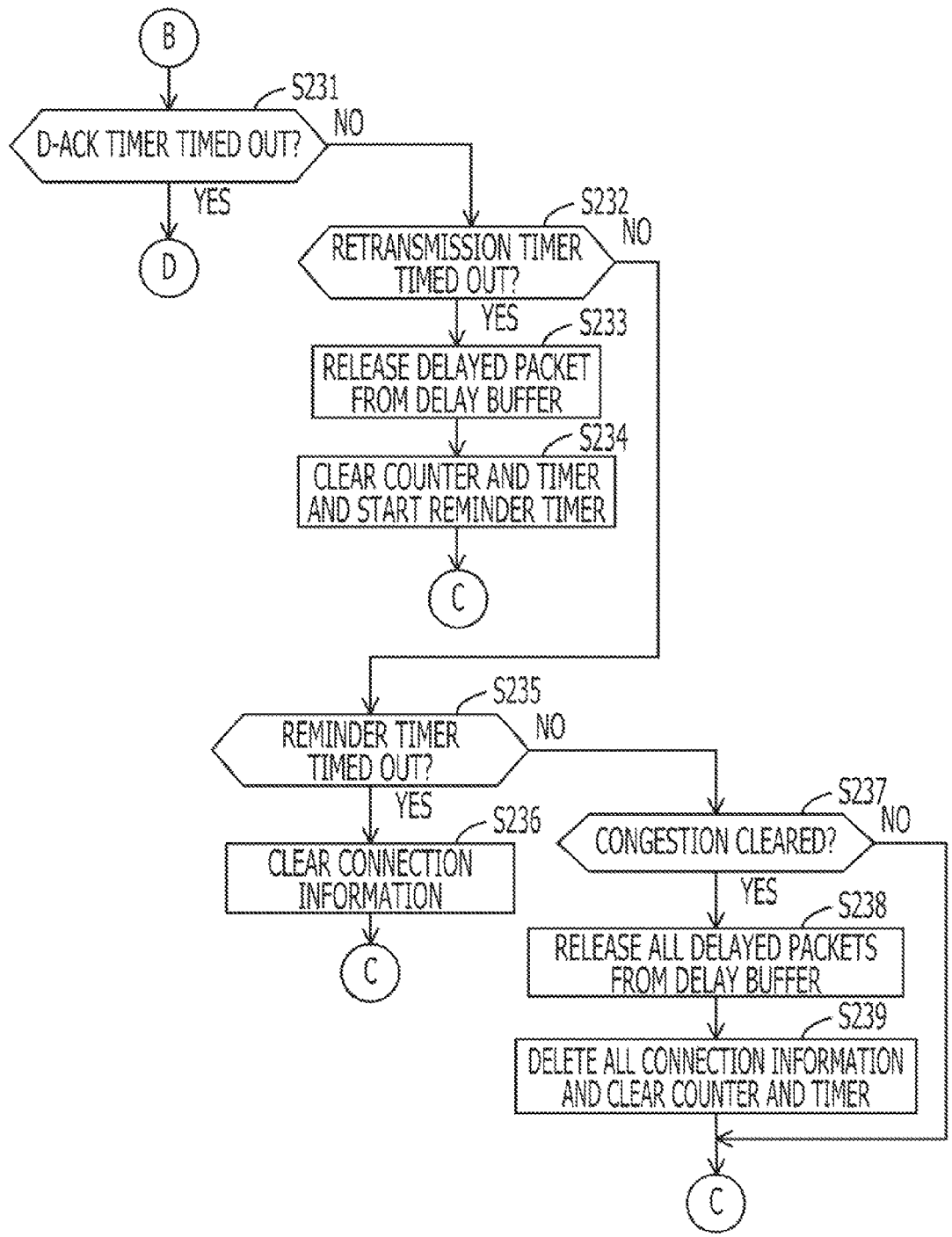
FIG. 16 illustrates a continuation of the congestion control process of FIG. 15.

FIG. 16 is a continuation of the congestion control process of the third embodiment.

The connection manager 220 determines whether any timer of the D-ACK timer 242 has timed out (Operation S231). If a timeout has occurred, processing proceeds to operation S226. The connection manager 220 then performs operation S226-229 in the timeout connection. If no timeout has occurred, processing proceeds to operation S232.

The connection manager 220 determines whether a timer of any connection has timed out in the retransmission timer 243 (Operation S232). If a timeout has occurred, processing proceeds to operation S233. If no timeout has occurred, processing proceeds to operation S235.

The connection manager 220 outputs the packet of the timeout connection stored on the delay buffer 250 from the delay buffer 250 to the buffer 260 (Operation S233).

The packet counter 241 clears the counter section corresponding to the connection having timed out in operation S232 (Operation S234). The D-ACK timer 242 and the retransmission timer 243 clear the timers thereof corresponding to the connection. The reminder timer 244 starts the timer corresponding to the connection. Processing thus ends.

The connection manager 220 determines the timer corresponding to the connection has timed out in the reminder timer 244 (Operation S235). If a timeout has occurred, processing proceeds to operation S236. If no timeout has occurred, processing proceeds to operation S237.

The connection manager 220 deletes from the connection table 231 the connection information of the connection having timed out in operation S235 (Operation S236). Processing thus ends.

The connection manager 220 determines whether the congestion has cleared (Operation S237). If the congestion has been cleared, processing proceeds to operation S238. If the congestion has not been cleared, processing ends.

The connection manager 220 outputs all the packets stored on the delay buffer 250 to the buffer 260 (Operation S238).

The connection manager 220 deletes all the connection information from the connection table 231 (Operation S239). The packet counter 241 clears all the counter sections. The D-ACK timer 242, the retransmission timer 243, and the reminder timer 244 clear all the timers thereof.

If any congestion occurs, the packet switch 200 stores a packet of at least one connection on the delay buffer 250 and suspends the transfer of the packet. The packet switch 200 predicts the timing until which the retransmission of the retained packet occurs, and then releases the packet at the timing. If the retained packet is retransmitted, the packet switch 200 corrects the parameter for use in the prediction of the timing.

If a retransmission occurs in a state that none of the packets subsequent to a retained packet has passed, the retransmission timeout time on the source terminal device may be different from the specified value. The timeout time on the retransmission timer 243 is thus adjusted. If a retransmission occurs after the packets of the number equal to twice the threshold value of the duplicate ACKs have passed followed by the release of the retained packet, the number of duplicate ACKs set on the source terminal device may be different from the specified value. The threshold value of the duplicate ACKs is thus adjusted. If the cause of a retransmission is different from the ones described above, the delayed ACK timeout time on the destination terminal device may be different from the specified value. The timeout time on the D-ACK timer 242 is thus adjusted.

The correction method of the parameter in operation S213-219 has been discussed for exemplary purposes only. Another correction method is contemplated. The process operation order in the flowcharts of FIGS. 14-16 has been discussed for exemplary purposes only, and the same congestion control process may be executed using another process operation order. For example, the parameter correction process in operation S213-219 may be performed subsequent to the process of the arrival packet or may be performed in parallel with the process of the arrival packet.

Once the corrected parameters are registered in the learning table 232 in the congestion control process, the same parameters may applied thereafter to the connection having the same source IP address, destination IP address, source port number, and destination port number. Considering the possibility of a modification to the settings on the terminal devices 21-24, an effective period may be set on the parameters registered in the learning table 232. In other words, the parameter remains effective for a specific period of time from the registration of the parameter (or the modification of the parameter) in the learning table 232.

Described below is a flow of packets in which a retransmission packet is detected and a parameter is corrected on the packet switch 200.

Figure 17:
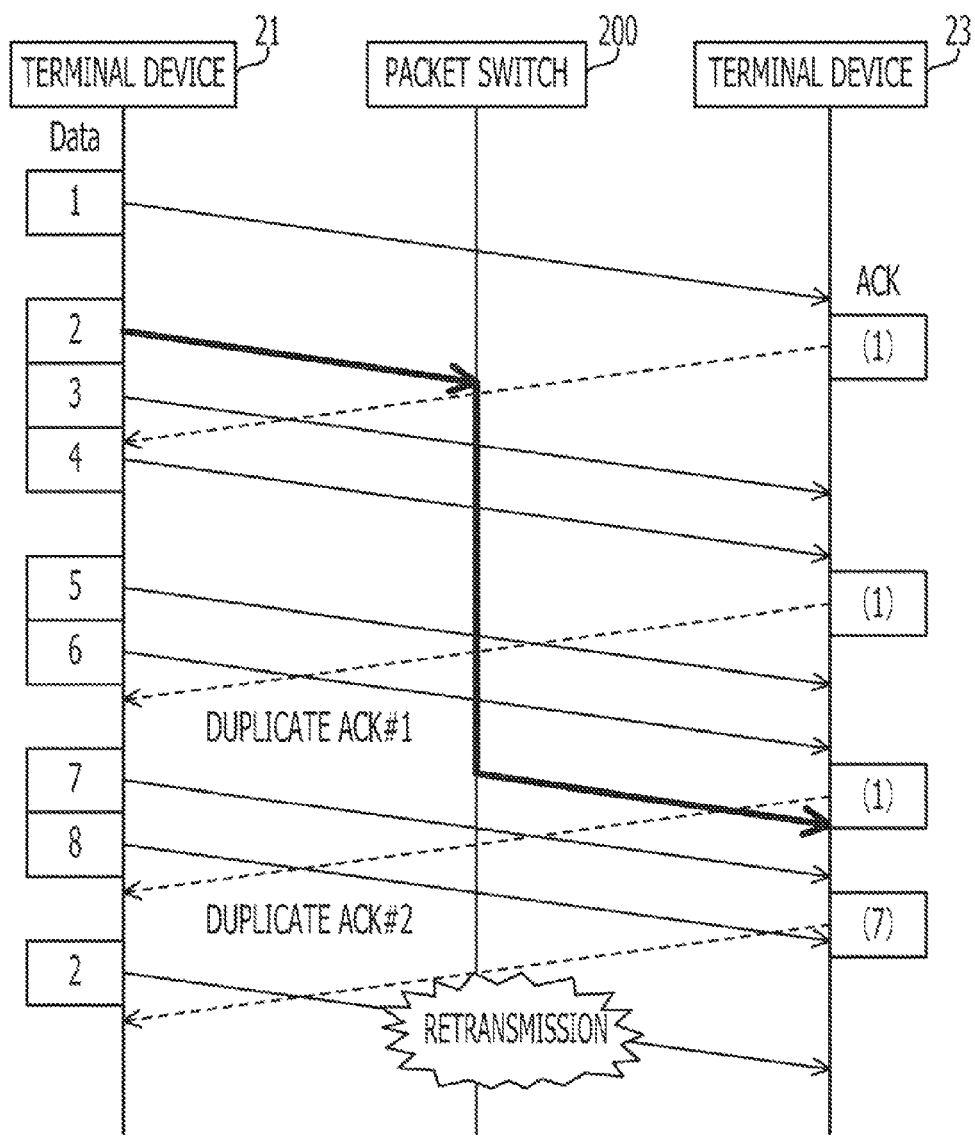
FIG. 17 illustrates a first sequence of correction of the release timing.

FIG. 17 illustrates a first sequence of a correction example of the release timing. The flow of packets #1-#8 illustrated in FIG. 17 is substantially identical the flow of packets #1-#8 illustrated in FIG. 8. In FIG. 17, the packet switch 200 predicts that the terminal device 21 retransmits the packet #2 upon the reception of the three duplicate ACKs. However, upon receiving the two duplicate ACKs, the terminal device 21 retransmits the packet #2. More specifically, since the threshold value on the duplicate ACKs on the terminal device 21 is different from the value predicted by the packet switch 200, the packet #2 is thus retransmitted.

The packet switch 200 detects the retransmission packet #2 by referencing the connection information and the sequence number remaining on the connection table 231. Up until now, the packet switch 200 releases the retained packet #2 after counting the subsequent packets of the number equal to twice the threshold value of duplicate ACKs (4 packets). The packet switch 200 thus determines that the set threshold value of duplicate ACKs on the terminal device 21 is different from the predicted threshold value, and then corrects the parameter. The possibility of the occurrence of retransmission is thus reduced hereinafter.

Figure 18:
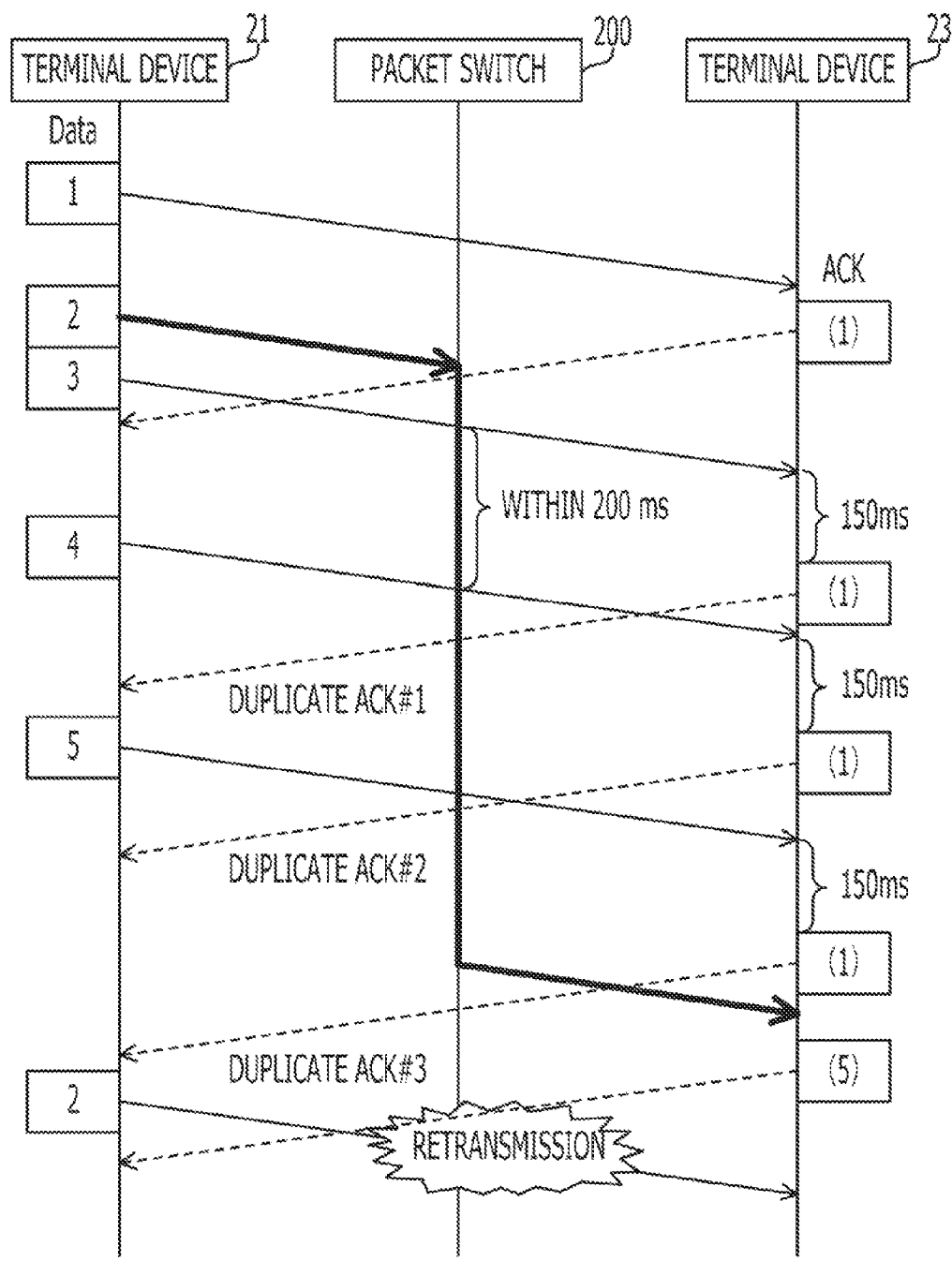
FIG. 18 illustrates a second sequence of the correction of the release timing.

FIG. 18 is a second sequence of the correction example of the release timing. The flow of packets #1-#5 illustrated in FIG. 18 is substantially identical the flow of packets #1-#5 illustrated in FIG. 9. In FIG. 17, the packet switch 200 predicts that the delayed ACK timeout time on the terminal device 23 is 200 ms, but the delayed ACK timeout time on the terminal device 23 is 150 ms in practice.

Since the delay ACK timeout time on the terminal device 23 is different from the value predicted by the packet switch 200, a third duplicate ACK is transmitted in practice at the timing when a second duplicate ACK is assumed to be transmitted. The packet #2 is thus retransmitted regardless of the prediction of the packet switch 200.

The packet switch 200 detects the retransmission packet #2 by referencing the connection information and the sequence number remaining on the connection table 231. Up until now, the packet switch 200 releases the retained packet #2 because of the timeout of the D-ACK timer 242. The packet switch 200 thus determines that the delayed ACK timeout time on the terminal device 23 is different from the predicted timeout time, and corrects the parameter. The possibility of the occurrence of retransmission is thus reduced hereinafter.

Figure 19:
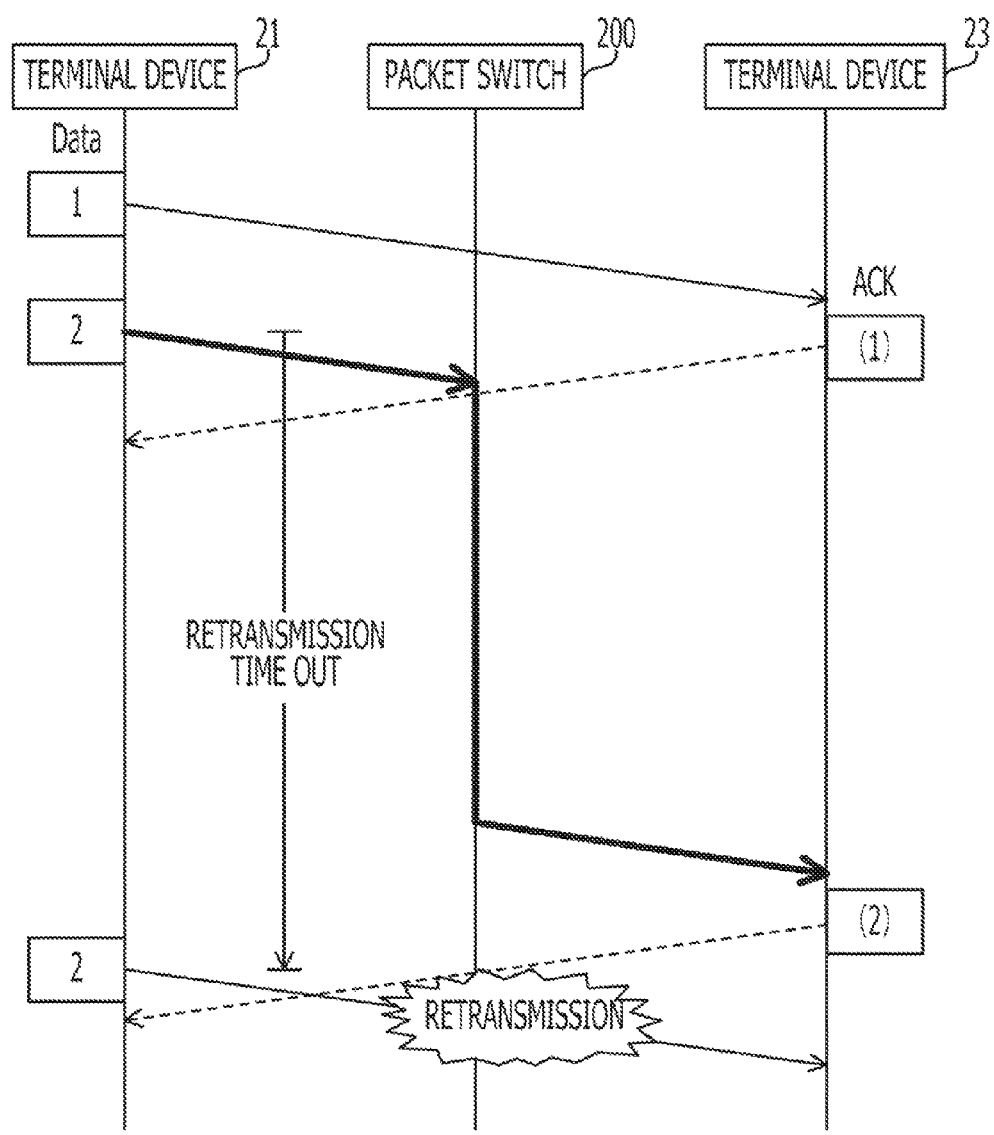
FIG. 19 illustrates a third sequence of the correction of the release timing.

FIG. 19 illustrates a third sequence of the correction example of the release timing. The flow packets #1 and #2 in FIG. 19 is substantially identical to the flow of packets #1 and #2 in FIG. 10. It is noted however that the packet #2 is retransmitted in response to the occurrence of retransmission timeout earlier in timing on the terminal device 21 than predicted by the packet switch 200.

The packet switch 200 detects the retransmission packet #2 by referencing the connection information and the sequence number remaining on the connection table 231. Up until now, the packet switch 200 releases the retained packet #2 without detecting any subsequent packet having the same connection. The packet switch 200 thus determines that the retransmission timeout time on the terminal device 21 is different from the predicted timeout time, and corrects the parameter. The possibility of the occurrence of retransmission is thus reduced hereinafter.

According to the communication system of the third embodiment, the packet switch 200 further automatically corrects the parameter to determine the transmission timing of the retained packet. More specifically, if a retransmission occurs at a timing different from a predicted timing, the possibility of the occurrence of retransmission is reduced more later. A decrease in the network communication efficiency is controlled through flexible process if packet communication is performed with the setting of the terminal devices 21-24 modified.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to any illustration of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet relay apparatus relaying packets exchanged between communication apparatuses with a connection established, the packet relay apparatus comprising:
   a buffer to store a packet selected from among arrival packets so that a transfer of the selected packet is to be suspended; and
   a congestion controller to monitor, after the storage of the selected packet on the buffer, at least one other packet passing through the packet relay apparatus, and causing the selected packet, stored on the buffer, to be transmitted at a timing responsive to a passage status of the at least one other packet having a same connection as the connection of the selected packet stored on the buffer,
wherein the congestion controller includes a counter counting a number of the at least one other packet having the same connection that arrived after and has passed through the packet relay apparatus while the selected packet is suspended and stored in the buffer, and the congestion controller determines the timing based on the number of the at least one other packet having the same connection passing through the packet relay apparatus,
wherein the congestion controller includes a connection manager to determine when congestion occurs for a connection, and the counter receives an instruction from the connection manager when congestion occurs, counts the number of the at least one other packet having the same connection passing through the packet relay apparatus, and causes transmission of the packet stored on the buffer at a timing at which the counter equals a specific number;
wherein the congestion controller estimates a number of response packets a communication apparatus operating as a destination of the packet stored on the buffer has transmitted to a communication apparatus operating as a source, based on the number of the at least one other packet of the same connection and a time elapse from a previous detection of a packet of the same connection, and determines the timing for transmission of the packet stored on the buffer based on the estimated number of response packets.

2. The packet relay apparatus according to claim 1, wherein the congestion controller determines the timing based on the number of the at least one other packet having the same connection and the time elapse from a previous detection of a packet of the same connection.

3. The packet relay apparatus according to claim 1, wherein the congestion controller determines the timing based on a time elapse from the storage of the packet on the buffer.

4. The packet relay apparatus according to claim 1, wherein the congestion controller corrects a parameter for use in the determination of the timing based on the passage status if a retransmission of the packet stored on the buffer is detected.

5. The packet relay apparatus according to claim 4, wherein the parameter includes at least one of a threshold value on the number of the at least one other packet having the same connection having passed through the packet relay apparatus and a threshold value on the time elapse from a previous detection of the packet having the same connection.

6. The packet relay apparatus according to claim 4, wherein the congestion controller corrects the parameter for use in the determination of the timing based on the time elapse from the storage of the packet on the buffer.

7. The packet relay apparatus according to claim 1, further comprising another buffer to temporarily store a packet waiting for transmission,
wherein the congestion controller determines a maximum number of connections of packets that are to be stored on the buffer, based on a number of packets retained on the other buffer.

8. A congestion control method in a packet relay apparatus relaying packets exchanged between communication apparatuses with a connection established, the congestion control method comprising:
storing, on a buffer, a packet selected from among arrival packets so that a transfer of the selected packet is to be suspended; and
monitoring, after the storage of the selected packet on the buffer, at least one other packet passing through the packet relay apparatus, and causing the selected packet, stored on the buffer, to be transmitted at a timing responsive to a passage status of the at least one other packet having a same connection as the connection of the selected packet stored on the buffer, wherein
the method further comprises
counting, with a counter, a number of the at least one other packet having the same connection that arrived after and has passed through the packet relay apparatus while the selected packet is suspended and stored in the buffer, and
determining the timing based on the number of the at least one other packet having the same connection passing through the packet relay apparatus, and
wherein a congestion controller includes a connection manager to determine when congestion occurs for a connection, and the counter receives an instruction from the connection manager when congestion occurs, counts the number of the at least one other packet having the same connection passing through the packet relay apparatus, and causes transmission of the packet stored on the buffer at a timing at which the counter equals a specific number;
estimating a number of response packets a communication apparatus operating as a destination of the packet stored on the buffer has transmitted to a communication apparatus operating as a source, based on the number of the at least one other packet of the same connection and a time elapse from a previous detection of a packet of the same connection, and determines the timing for transmission of the packet stored on the buffer based on the estimated number of response packets.

9. The congestion control method according to claim 8, wherein
the determining includes determining the timing based on the number of the at least one other packet having the same connection and the time elapse from a previous detection of a packet of the same connection.

10. The congestion control method according to claim 8, further comprising: determining the timing based on a time elapse from the storage of the packet on the buffer.

11. The congestion control method according to claim 8, further comprising:
correcting a parameter for use in the determination of the timing based on the passage status if a retransmission of the packet stored on the buffer is detected.

12. The congestion control method according to claim 11, wherein the parameter includes at least one of a threshold value on the number of the at least one other packet having the same connection having passed through the packet relay apparatus and a threshold value on the time elapse from a previous detection of the packet having the same connection.

13. The congestion control method according to claim 11, wherein
the correcting includes correcting the parameter for use in the determination of the timing based on the time elapse from the storage of the packet on the buffer.

14. The congestion control method according to claim 8, further comprising:
storing, on another buffer, a packet waiting for transmission, and wherein
the determining includes determining a maximum number of connections of packets that are to be stored on the buffer, based on a number of packets retained on the other buffer.

* * * * *